US007400762B2

(12) United States Patent  
Munsil et al.

(10) Patent No.: US 7,400,762 B2
(45) Date of Patent: Jul. 15, 2008

(54) STRATEGIES FOR PERFORMING SCALING OPERATIONS ON IMAGE INFORMATION

(75) Inventors: Donald J. Munsil, Kirkland, WA (US); Glenn F. Evans, Kirkland, WA (US); Stacey L. Spears, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/276,790

(22) Filed: Mar. 14, 2006

(65) Prior Publication Data

US 2006/0153476 A1  Jul. 13, 2006

Related U.S. Application Data

(60) Division of application No. 10/987,378, filed on Nov. 12, 2004, now Pat. No. 7,158,668, which is a continuation-in-part of application No. 10/902,325, filed on Jul. 29, 2004.

(60) Provisional application No. 60/492,029, filed on Aug. 1, 2003.

(51) Int. Cl.  
*G06K 9/00* (2006.01)

(52) U.S. Cl. .................................... 382/162

(58) Field of Classification Search ................ 382/162, 382/167, 254, 260–266; 345/501, 505, 522, 345/582, 589, 597  
See application file for complete search history.

(56) References Cited

U.S. PATENT DOCUMENTS

| 4,463,372 A | 7/1984 | Bennett et al. |
| 4,601,055 A | 7/1986 | Kent |
| 4,639,763 A | 1/1987 | Willis et al. |
| 4,866,637 A | 9/1989 | Gonzalez-Lopez et al. |
| 5,014,327 A | 5/1991 | Potter et al. |
| 5,179,641 A | 1/1993 | Comins et al. |

(Continued)

FOREIGN PATENT DOCUMENTS

EP  0600204  6/1994

(Continued)

OTHER PUBLICATIONS

U.S. Appl. No. 10/273,505, filed Oct. 18, 2002, entitled "Methods and Apparatuses for Facilitating Processing of Interlaced Video Images for Progressive Video Displays," Stephen Estrop.

(Continued)

*Primary Examiner*—Jose L. Couso  
(74) *Attorney, Agent, or Firm*—Lee & Hayes, PLLC

(57) ABSTRACT

Strategies are set forth for performing a scaling operation on image information using a filter. According to one exemplary implementation, the strategies involve: computing, based on scaling to be performed, a number of filter kernels required to implement the filter and a number of taps required for each filter kernel; pre-computing and storing the number of filter kernels; and applying the filter kernels to a row or column of the image information by repeatedly sequencing through the filter kernels if there are more pixel elements in the row or column than there are pre-calculated filter kernels. The scaling operation can employ a Catmull-Rom filter. Further, the scaling operations can be implemented by a pixel shader by assigning weighting information and delta-shifted versions of the image information to respective texture units of the pixel shader.

16 Claims, 19 Drawing Sheets

U.S. PATENT DOCUMENTS

| | | | |
|---|---|---|---|
| 5,218,674 | A | 6/1993 | Peaslee et al. |
| 5,235,432 | A | 8/1993 | Creedon et al. |
| 5,325,448 | A | 6/1994 | Katayama et al. |
| 5,508,812 | A | 4/1996 | Stevenson et al. |
| 5,565,994 | A | 10/1996 | Eschbach |
| 5,602,943 | A | 2/1997 | Velho et al. |
| 5,715,459 | A | 2/1998 | Celi, Jr. et al. |
| 5,742,797 | A | 4/1998 | Celi, Jr. et al. |
| 5,757,386 | A | 5/1998 | Celi, Jr. et al. |
| 5,793,371 | A | 8/1998 | Deering |
| 5,870,503 | A | 2/1999 | Kumashiro |
| 5,872,956 | A | 2/1999 | Beal et al. |
| 5,892,847 | A | 4/1999 | Johnson |
| 5,936,632 | A | 8/1999 | Cuniff et al. |
| 5,940,141 | A | 8/1999 | Faroudja et al. |
| 5,982,453 | A | 11/1999 | Willis |
| 6,034,733 | A | 3/2000 | Balram et al. |
| 6,047,295 | A | 4/2000 | Endicott |
| 6,144,390 | A | 11/2000 | Ensor |
| 6,195,098 | B1 | 2/2001 | Brittain et al. |
| 6,208,350 | B1 | 3/2001 | Herrera |
| 6,212,574 | B1 | 4/2001 | O'Rourke et al. |
| 6,262,773 | B1 | 7/2001 | Westerman |
| 6,269,484 | B1 | 7/2001 | Simsic et al. |
| 6,295,068 | B1 | 9/2001 | Peddada et al. |
| 6,307,559 | B1 | 10/2001 | Hancock et al. |
| 6,317,165 | B1 | 11/2001 | Balram et al. |
| 6,323,875 | B1 | 11/2001 | Millman et al. |
| 6,331,874 | B1 | 12/2001 | de Garrido et al. |
| 6,332,045 | B1 | 12/2001 | Sawada et al. |
| 6,353,438 | B1 | 3/2002 | Van Hook et al. |
| 6,369,855 | B1 | 4/2002 | Chauvel |
| 6,370,198 | B1 | 4/2002 | Washino |
| 6,466,226 | B1 | 10/2002 | Watson et al. |
| 6,496,183 | B1 | 12/2002 | Bar-Nahum |
| 6,509,930 | B1 | 1/2003 | Hirano et al. |
| 6,567,098 | B1 | 5/2003 | D'Amora |
| 6,573,905 | B1 | 6/2003 | MacInnis et al. |
| 6,587,129 | B1 | 7/2003 | Lavendel et al. |
| 6,611,269 | B1 | 8/2003 | Uehara et al. |
| 6,654,022 | B1 | 11/2003 | Egan |
| 6,690,427 | B2 | 2/2004 | Swan |
| 6,753,878 | B1 | 6/2004 | Heirich et al. |
| 6,788,312 | B1 | 9/2004 | Azar et al. |
| 6,806,982 | B2 | 10/2004 | Newswanger et al. |
| 6,831,999 | B2 | 12/2004 | Haikin |
| 6,833,867 | B2 | 12/2004 | Hei La |
| 6,859,235 | B2 | 2/2005 | Walters |
| 6,885,374 | B2 | 4/2005 | Doyle et al. |
| 6,928,196 | B1 | 8/2005 | Bradley et al. |
| 6,940,557 | B2 | 9/2005 | Handjojo et al. |
| 6,952,215 | B1 | 10/2005 | Devins et al. |
| 7,151,863 | B1 * | 12/2006 | Bradley et al. .............. 382/299 |
| 7,158,668 | B2 | 1/2007 | Munsil et al. |
| 7,180,525 | B1 * | 2/2007 | Naegle ....................... 345/596 |
| 7,219,352 | B2 | 5/2007 | Estrop |
| 2002/0063801 | A1 | 5/2002 | Richardson |
| 2002/0145610 | A1 | 10/2002 | Barilovits |
| 2002/0145611 | A1 | 10/2002 | Dye et al. |
| 2002/0154324 | A1 | 10/2002 | Tay et al. |
| 2003/0117513 | A1 | 6/2003 | Ferlitsch |
| 2003/0158979 | A1 | 8/2003 | Tateyama et al. |
| 2004/0032906 | A1 | 2/2004 | Lillig |
| 2004/0054689 | A1 | 3/2004 | Salmonsen et al. |
| 2005/0050554 | A1 | 3/2005 | Martyn |

FOREIGN PATENT DOCUMENTS

| | | |
|---|---|---|
| EP | 0651577 A2 | 5/1995 |
| JP | 2000311240 | 11/2000 |
| JP | 2001084154 | 3/2001 |
| WO | WO0161992 | 8/2001 |
| WO | WO02067577 | 8/2002 |

OTHER PUBLICATIONS

U.S. Appl. No. 10/400,040, filed Mar. 25, 2003, entitled "Facilitating Interaction Between Video Renderers and Graphics Device Drivers," Stephen Estrop.

U.S. Appl. No. 10/694,144, filed Oct. 27, 2003, entitled "Bandwidth-Efficient Processing of Video Images," Steven Estrop.

U.S. Appl. No. 10/902,325, filed Jul. 29. 2004, entitled "Strategies for Processing Image Information Using a Color Information Data Structure," Evans et al.

U.S. Appl. No. 10/987,378, filed Nov. 12, 2004, entitled "Image Processing Using Linear Light Values and Other Image Processing Improvements," Munsil et al.

Introductory page entitled "An Introduction to QuickTimeTM," available at <<http://developer.apple.com/quicktime/qttutorial/overview.html>>, accessed on Jan. 13, 2004, 2 pages.

Birn, "Digital Lighting & Rendering," 2001, available at <<http://www.3drender.com/glossary/fields.htm>>, 2 pages.

Blome, "Introducing Some New Video Mixing Renderer Sample Applications," dated Apr. 2003, available at <<http://msdn.microsoft.com/library/default.asp?uri=library/en-us/dnwmt/html/introducingsomenewvideomixingrenderersampleapplica.asp>>, accessed on Feb. 2, 2004, 20 pages.

Introductory page entitled "Deinterlacing and Frame-Rate Conversion," MSDN Library technical literature, available at <<http://msdn.microsoft.com/library/default.asp?url=/library/en-us/graphics/hh/graphics/dxvaguide_0t2f.asp>>, accessed on Feb. 2, 2004, 1 page.

Ford, et al., "Color Space Conversions," dated Aug. 11, 1998, available at <<http://www.poynton.com/PDFs/coloureq.pdf>>, accessed on Jul. 28, 2004, 31 pages.

"GPU: Changes Everything," available at <<http://www.nvidia.com/object/gpu.html>>, 2 pages.

He, et al., "Development and Application of the NT Device Driver in CNC System," Journal of Shanghai University (English Edition), ISSN 1007-6417, Dec. 2001, vol. 5, No. 4, pp. 317-321.

Hui, et al., "Implementation of MPEG stream analyzer," Journal of China Institute of Communications, vol. 22, No. 10, Oct. 2001, pp. 57-62.

Mann, "The Graphics Rendering Pipeline," 1997, available at <<http://medialab.di.unipi.it/web/IUM/Waterloo/node7.html>>, 2 pages.

Marjanovic, "Chroma Subsampling Standards," Mar. 31, 2003, available at <<http://www.mir.com/DMG/chroma.html>>, 5 pages.

Mirza, et al., "DirectX 9.0: Introducing the New Managed 3D Graphics API in the .Net Framework," from the Apr. 2003 issue of MSDN Magazine, available at <<http://msdn.microsoft.com/library/default.asp?url=/msdnmag/issues/03/07/DirectX90/toc.asp?>>, accessed on Feb. 2, 2004, 10 pages.

Munsil, et al., "The Chroma Upsampling Error and the 4:2:0 Interlaced Chroma Problem," Secrets of Home Theater and High Fidelity, DVD Benchmark, accessible at <<http://www.hometheaterhifi.com/volume 8 2/dvd-benchmark-special-report-chroma-bug-4-2001.html>>, Jan. 2003, 20 pages.

"Definitions of Parallel Processing on the Web," available at <<http://www.google.com/search?hl=en&lr=oi=defmore&q=define:parallel+processing>>, 3 pages.

Poynton, "Digital Video and HDTV: Algorithms and Interfaces," Morgan Kaufmann Publishers, 2003, table of contents, pp. xi to xxiii, and chapter 24, pp. 281-300.

Poynton, "FAX about Color," 1997, available at <<http://www.pynton.com/PDFws/ColorFAQ.pdf>>, accessed on Jul. 28, 2004, 24 pages.

Poynton, "Frequently Asked Questions about Gamma," 1998, available at <<http://www.poynton.com/PDFs/GammaFAQ.pdf>>, accessed on Jul. 28, 2004, 12 pages.

Rawlins, "A Standards Solution to Your Graphics Problems," Graphic Software Systems, Inc., Frontiers in Computer Graphics, Proceedings of Computer Graphics Tokyo '85, Springer-Verlag, pp. 375-416.

"Understanding Analog Video Signals", Dallas Maxim, Application Note 1184, available at <<http://www.maxim-ic.com/appnote.cfm/appnote_numbe/1184>>, Sep. 4, 2002, 12 pages.

Union, "Accessing Device Drivers from C#," Windows Developer Magazine, available at <<www.wd-mag.com>>, vol. 13, No. 4, Apr. 2002, pp. 19, 20, 22, 23, 26, and 27.

Wolfgang, "Direct3D ShaderX: Vertex and Pixel Shader Tips and Tricks," Wordware Publishing, Inc., 2002, pp. 72-124.

"YCbCr to RGB Considerations," Intersil Application note, AN9717, Mar. 1997, available at <<http://www.intersil.com/data/an/an9717.pdf>>, 2 pages.

"YUV," Wikipedia excerpt, available at <<http://en.wikipedia.org/wiki/YUV>>, 3 pages.

"Gamma, Linear Color Space and HDR," available at <<http://softimage.wiki.avid.com/index.php/Gamma,_Linear_Color_Space_and_HDR>>, accessed on Jul. 21, 2006, 7 pages.

Programming in Java Advanced Imaging, Chapter 5, Sun Microsystems, Inc., 1999, available at <<http://java.sun.com/products/java-media/jai/forDevelopers/jai1_0_1guide-unc/Color.doc.html>>, accessed on Jul. 21, 2006, 12 pages.

European Search Report For European Patent Application No. 2005026761 Mailed On Oct. 24, 2007, pp. 11.

Search report from Malaysian Application No. PI 20031681, which is related to the subject application, dated Apr. 9, 2007, one page.

* cited by examiner

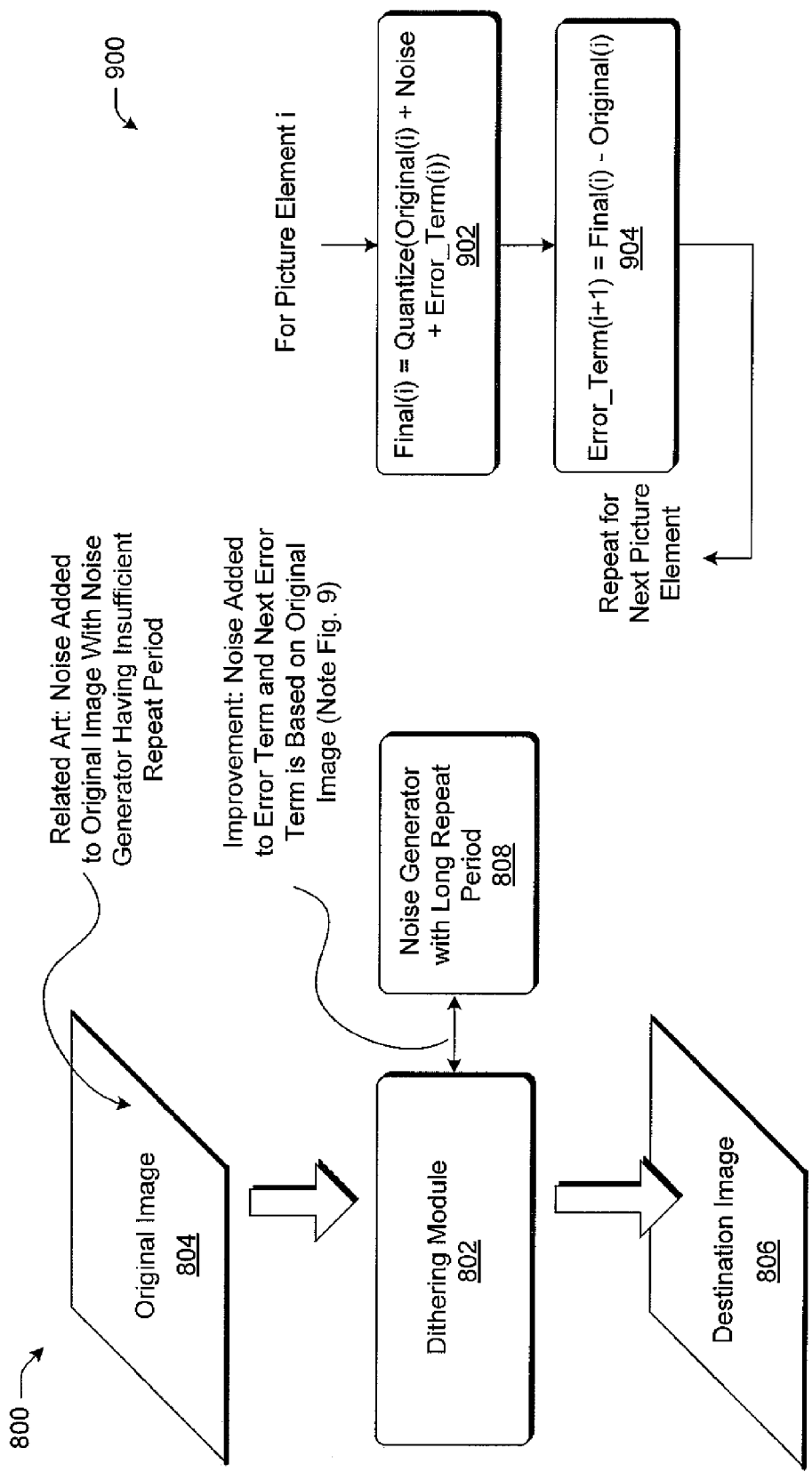

STRATEGIES FOR PERFORMING SCALING OPERATIONS ON IMAGE INFORMATION

REFERENCE TO COPENDING APPLICATIONS

This application is a divisional of Non-Provisional application Ser. No. 10/987,378, filed on Nov. 12, 2004 now U.S. Pat. No. 7,158,668 (the '378 Application), entitled "Image Processing Using Linear Light Values and Other Image Processing Improvements," naming Donald J. Munsil, Glenn F. Evans and Stacey L. Spears as inventors. The '378 Application, in turn, is a continuation-in-part of U.S. Non-Provisional application Ser. No. 10/902,325 (the '325 Application), filed on Jul. 29, 2004, entitled "Strategies for Processing Image Information Using a Color Information Data Structure," naming Glenn F. Evans and Stephen J. Estrop as inventors. The '325 Application, in turn, claims the benefit of U.S. Provisional Application No. 60/492,029 (the '029 Application), filed on Aug. 1, 2003.

This application is also related to two other divisional applications, filed concurrently with the present application, wherein these two divisional application also claim benefit to the '378 Application. The first related divisional application is entitled "Strategies for Producing Quantized Image Information," and names Donald J. Munsil, Glenn F. Evans and Stacey L. Spears as inventors, and is assigned application Ser. No. 11/276,788. The second related divisional application is entitled "Strategies for Optimally Generating Pipeline Processing Code," and names Donald J. Munsil as inventor, and is assigned application Ser. No. 11/276,791.

Each of the applications mentioned above are incorporated by reference herein in their respective entireties.

TECHNICAL FIELD

This subject matter pertains to strategies for processing image information, and, in a more particular implementation, to strategies for processing video image information using a video processing pipeline.

BACKGROUND

Exemplary Problems in the Video Processing Arts

Video processing technology in use today is best understood by tracing the evolution of such technology over the years. Features have been added at various stages to in the evolution to address problems facing the industry at those times. To maintain compatibility and consistency, later technology may have retained some of these features, even though the problems that the features were designed to solve had since vanished. As a result, current technology can be viewed as an agglomeration of such historical-based features, reflecting a series of prior problems facing the industry at different times, compromises among standards groups, changing technological-based constraints and opportunities, and so forth.

One consequence of the above-described nature of video processing technology is that those working in the field have developed entrenched mindsets regarding certain aspects of video processing technology. There are fixed notions regarding how to interpret certain video information and fixed notions regarding how to "correctly" process such video information. As appreciated by the present inventors, many of these settled notions are not well founded and need to be reconsidered.

Chief among the fixed notions is that video information should generally be processed in the form that it is received, either from a broadcast source, a storage medium (e.g., a DVD disc), or other source. However, many video standards were not designed with the expectation that the video information would be processed prior to display. For example, conventional televisions do not accommodate complex processing functionality; these devices simply receive and display video information. As such, the form that the video information is received may not readily accommodate the efficient processing of such information.

As a result, the direct application of standard processing algorithms on many accepted forms of video information produces various artifacts. Those skilled in the art have taken note of these artifacts on some occasions. However, rather than questioning the basic premises of the techniques being employed, these practitioners have often resorted to local patches to remedy the problems. These solutions may mask the problems in certain application-specific situations, but do not solve the problems in general.

For example, video information is often received by a video processing pipeline in a form that is nonlinear, interlaced, chroma subsampled, and expressed in some variant of a luma-related color space (e.g., Y'U'V' information). (The term "nonlinear" means that that there is a nonlinear relationship between an incoming signal and resultant output brightness produced from this signal; other terms in the preceding sentence will be explicated fully below.) Practitioners may attempt to apply various linear-type processing algorithms to this information to modify it in a prescribed manner, such as by resizing the video information, combining the video information with other information (e.g., compositing), and so forth. As appreciated by the present inventors, many of these algorithms do not provide optimal or even correct results when processing nonlinear video information of this nature. Working only with interlaced chroma subsampled 4:2:2 or 4:2:0 information (to be defined below) compounds these poor results. For instance, processing information in 4:2:2 or 4.2:0 can result in the propagation of errors through different stages of the video processing pipeline.

The deficiencies in the processed results are manifested in various artifacts, which may or may not be apparent to the naked eye. Again, those skilled in the art may have noticed the poor results, but have not identified the causes. In some cases, this may be due to practitioners' failure to fully understand the complex nature of many video coding standards. In other cases, practitioners may be unaware that they are using linear algorithms to process nonlinear information; indeed, in some cases the practitioners may incorrectly believe that they are dealing with linear information. Also, the general focus in the video processing art has been aimed at the production of image information, not necessarily the intermediary processing and correction of such information.

The application of linear-type algorithms to nonlinear information is just one example of the above-described entrenched mindset in the video processing art. As will be described below, many other techniques have become fixed which do not produce optimal results, such as in the case of dithering. For example, practitioners may attempt to remedy artifacts caused by some dithering-quantization algorithms by adding a small amount of random noise to input image information and then quantizing the resultant noisy image. These techniques assess the quantization error by then computing the difference between the noisy image and the quantized result. This may have the effect of curing the dithering artifacts, but at the price of making the output image nosier in proportion to the amount of random noise added to the original image information.

There are many other instances of settled ideas in the video processing art that continue to be applied, because of custom and familiarity, without recognition of their significant but subtle drawbacks. The general theme of the improvements described herein involves the reconsideration of these rigid ideas, coupled with the design of alternative solutions.

The video processing field is rich in terminology. Accordingly, as a preliminary matter, a brief introduction to certain topics in the video processing field will be set forth below to assist the reader. For instance, several of the terms used above in passing (linear, interlaced, luma, chroma-subsampled, etc.) are defined below. As a general matter of terminology, the term "image information" will be used throughout this document to represent a broad class of information that can be rendered as any kind of visual output, including, but not limited to, motion video information.

Background Concepts

Color Space and Related Considerations

Colors can be specified using three components. An image stream that relies on the transmission of color content using discrete color components is referred to as component video. One common specification defines color using red, green and blue (RGB) components. More formally, the RGB components describe the proportional intensities of the reference lamps that create a perceptually equivalent color to a given spectrum. In general, an RGB color space can be specified by the chromatic values associated with its color primaries and its white point. The white point refers to the chromaticity associated with a reference white color.

Electronic apparatuses that reproduce color images complement the trichromatic nature of human vision by providing three types of light sources. The three types of light sources produce different spectral responses that are perceived as different colors to a human observer. For instance, a cathode ray tube (CRT) provides red, green and blue phosphors to create different colors, thus complementing some variant of the RGB color space discussed above. Other technologies do not use phosphors, but otherwise reproduce color using light sources that emit at least three kinds of light.

However, the RGB coding model is not an efficient choice for the transmission of image information, and does not conform well with some older standards. Accordingly, image information is commonly transmitted to a target apparatus using some coding model other than RGB. Upon receipt, the image information can be internally transformed by a display apparatus into a RGB-related color space for presentation. As a will be described below under the heading "Gamma Considerations," each R, G, or B component data can be expressed in terms of its pre-gamma corrected form, referred to as R', G' and B' values. (Generally, as per convention, the prime denotes nonlinear information in this disclosure.)

A common tactic in this regard is to define color by reference to a luminance-related component (Y) and chroma-related components. Luminance general refers to the perceived intensity (brightness) of light. Luminance can be expressed in a pre-gamma-corrected form (in the manner described below under "Gamma Considerations") to yield its nonlinear counterpart, referred to as "luma" (Y'). The chroma components define the color content of the image information relative to the luma. For example, in the digital domain, the symbol "Cb" corresponds to an n bit integer scaled representation of the difference B'-Y' (typically from the range of −127 . . . 128 in 8 bit values), and the symbol "Cr" corresponds to an n bit integer scaled representation of the difference R'-Y'. The symbol "Pb" refers to the analog counterpart of Cb, and the symbol "Pr" refers to the analog counterpart of Cr. The symbols Pb and Pr can also refer to the digital normalized form of Cb or Cr with a nominal range of [−0.5 . . . 0.5]. The component image information defined by CbCr and PbPr may be formally primed (e.g., Cb'Cr' and Pb'Pr') as they represent nonlinear information. However, since Pb, Pr, Cb, or Cr always refer to nonlinear data, the primed notation is often dropped as a matter of convenience and convention (for example, the notation Y'PbPr is used instead of Y'Pb'Pr').

Color content can also be communicated as composite video (rather than the above-described component video). Composite signals combine luma and chroma information in one signal. For instance, in the coding system Y'UV, U represents a scaled version of B-Y and V represents a scaled version of R-Y. These luma and chroma components are then processed to provide a single signal. The coding system Y'IQ s defines another composite coding system formed by transforming the U and V components in a prescribed manner. One reason that the industry has historically promoted the use of Y-related color spaces (Y'CbCr, Y'PbPr, YUV, YIQ, etc.) is because reducing color image information in these color spaces can be performed more easily compared to image information expressed in the RGB color space. These color spaces are also backward compatible with older standards developed for black and white image information. The term "luma-related information" generally refers to any color space is that has a brightness-related component and chroma-related components, and encompasses at least all of the color spaces mentioned above.

It is generally possible to transform color content from one color space to another color space using one or more matrix affine transformations. More formally, the property of metamerism makes it possible to express one set of color space coefficients in terms of another set of matching functions (where "metamers" refer to two spectra which map to the same set of color space coefficients, and hence appear to be perceptually identical—that is, that took like the same color).

Gamma Considerations

Cathode ray tubes (CRTs) do not have a linear response transfer function. In other words, the relationship of voltage applied to a CRT and the resultant luminance produced by the CRT does not define a linear function. More specifically, the predicted theoretical response of a CRT has a response proportional to the 5/2 power law; that is, for a given input voltage "V," the CRT's resultant luminance "L" can be computed as $L=V^{2.5}$. The transfer function is also referred to herein as a "gamma response function," and the exponent of the voltage signal is referred to as the "gamma."

On the other hand, when image information is captured by a camera or generated by a 3-D rendering system, image information is expressed in a linear RGB color space, meaning that there is a linear relationship between incoming signal and output brightness. To address the disparity between the linearity of the camera and the nonlinearity of the display, cameras conventionally pre-compensate the signal they produced by applying the inverse of the gamma. In other words, the transfer function of the camera (sometimes referred to as the encoding transfer function) is approximately the inverse function of the CRT luminance response. The result of the application of the encoding transfer function (or the reverse gamma) is to produce "gamma-corrected" image information which is nonlinear in form. When the nonlinear signal is passed through the display device, a close-to-linear luminance is produced. Once again, according to the notation described above, the nonlinear (or precompensated) image information is denoted by priming its components, e.g., R'G'B' or Y'CbCr (where the primes on the Cb and Cr components are implied).

It has thus become commonplace and standard to store and transmit image information in its luma-chroma nonlinear (compensated) form. To maintain compatibility, any source producing a signal to be displayed on a CRT should also first apply the inverse function to the signal.

As a special consideration, encoding of image information using a transfer function commonly applies a special approximation function for the low voltage portion of the function. Namely, encoding techniques commonly provide a linear segment in this portion to reduce the effects of noise in the imaging sensor. This segment is referred to as a "linear tail," having a defined "toe slope." This segment improves the quality of image information presented on actual CRTs, as these devices have linear luminance-voltage responses near 0 due to the physical construction of these devices.

Sampling and Alignment of Chroma Information Relative to Luma Information

Human vision is more responsive to changes in light intensity than the chromatic components of light. Coding systems take advantage of this fact to reduce the amount of chroma (CbCr) information that is coded relative to the amount of luma information (Y'). This technique is referred to as chroma sub-sampling. A numeric notation represented generically as L:M:N can be used to express this sampling strategy, where "L" represents the sampling reference factor of the luma component (Y'), and "M" and "N" refer to the chroma sampling (e.g., Cb and Cr, respectively) relative to the luma sampling (Y'). For instance the notation 4:4:4 can denote Y'CbCr data in which there is one chroma sample for every luma sample. The notation 4:2:2 can denote Y'CbCr data in which there is one chroma sample for every two luma samples (horizontally). The notation 4:2:0 can denote Y'CbCr data in which there is one chroma sample for every two-by-two cluster of luma samples. The notation 4:1:1 can denote Y'CbCr data in which there is one chroma sample for every four luma samples (horizontally).

In those circumstances where the coding strategy provides more luma information than chroma information, a decoder can reconstruct the "missing" chroma information by performing interpolation based on the chroma information that is supplied, More generally, downsampling refers to any technique that produces fewer image samples in comparison with an initial set of image samples. Up-sampling refers to any technique that produces more image samples in comparison with the initial set of image samples. Thus, the above-described interpolation defines a type of up-sampling.

Coding strategies also specify the manner in which chroma samples are spatially "aligned" to the corresponding luma samples. Coding strategies differ in this regard. Some align the chroma samples with the luma samples, such that the chroma samples are directly positioned "over" the luma samples. This is referred to as cositing. Other strategies position chroma samples in interstitial spaces within the two-dimensional array of luma samples.

Quantization Considerations

Quantization refers to the methodology whereby discrete numeric values are it assigned to the signal amplitudes of color components (or black and white information). In the digital domain, the numeric values span a prescribed range (gamut) of color space values in a prescribed number of steps. It is common, for instance, to use 255 steps for describing each component value, such that each component can assume a value from 0 to 255. It is common to express each color value using 8 bits.

Converting from a high precision number to a lower precision number can sometimes produce various artifacts. Various error dispersion algorithms have been devised to address this problem, such as the Floyd-Steinberg algorithm. Error dispersion algorithms can distribute the errors produced by the round-off effects of quantization to neighboring pixel locations. Further background information regarding the Floyd-Steinberg algorithm is presented within the body of the Detailed Description to follow.

Interlaced vs. Progressive Representation Considerations

Originally, televisions only displayed only black and white image information in top-down progressive sweep fashion. Today, conventional television signals are scanned in interlaced fashion. In interlacing, a first field of a video frame is captured, followed, shortly thereafter, by a second field of the video frame (e.g., ⅟₅₀ or ⅟₆₀ seconds thereafter). The second field is vertically offset relative to the first field by a slight amount, such that the second field captures information in the interstitial spaces between scanning lines of the first field. Video information is presented by displaying the first and second fields in quick succession so that the video information is generally perceived by a human viewer as a single contiguous flow of information.

However, computer monitors and other presentation equipment display image information in progressive, not interleaved, fashion. Thus, in order for an apparatus to present interlaced information on a computer monitor, it must display progressive frames at the interlaced field rate by interpolating the data for the opposite field (a process referred to as "de-interlacing"). For example, to display an interlaced field, it must interpolate the "missing" data for the spatial location between the lines by examining the fields on either side. The term "progressive format" refers generally to any non-interlaced image format.

Image information (e.g., from a video camera) is typically stored in an interlaced form, e.g., where the first field is separately stored (semantically) from the second field. If image information is simply to be displayed on an interlaced TV display, its Y'UV interlaced information can be passed directly to the CRT. The CRT internally converts the Y'UV information to R'G'B' information and drives the output guns using this signal.

Interlacing is advantageous because it doubles the effective vertical resolution of image information. However, interlacing can also introduces artifacts. This is because objects can move at 60 hz, but, in interlaced presentation, only half of the information is shown every 30 hz. The resultant artifact produced by this phenomenon is sometimes referred to as "feathering." The artifact manifests itself particularly in the display of high motion video, where objects appear to separate into even and odd lines.

Additional information regarding each of the above bullet point topics may be found in a number of introductory texts, such as Charles Poyton's well-regarded *Digital Video and HDTV* (Morgan Kaufmann Publishers, 2003).

SUMMARY

Strategies are set forth for performing a scaling operation on image information using a filter. According to one exemplary implementation, the strategies involve: computing, based on scaling to be performed, a number of filter kernels required to implement the filter and a number of taps required for each filter kernel; pre-computing and storing the number of filter kernels; and applying the filter kernels to a row or column of the image information by repeatedly sequencing through the filter kernels if there are more pixel elements in the row or column than there are pre-calculated filter kernels. The scaling operation can employ a Catmull-Rom filter. Further, the scaling operations can be implemented by a pixel shader by assigning weighting information and delta-shifted versions of the image information to respective texture units of the pixel shader.

BRIEF DESCRIPTION OF THE DRAWINGS

FIG. 8 shows an exemplary system for providing dithering and error dispersion which yields superior results to the models described in connection with FIGS. 6 and 7.

FIG. 9 shows an exemplary procedure for performing dithering and error dispersion using the system of FIG. 8.

Figure 1:
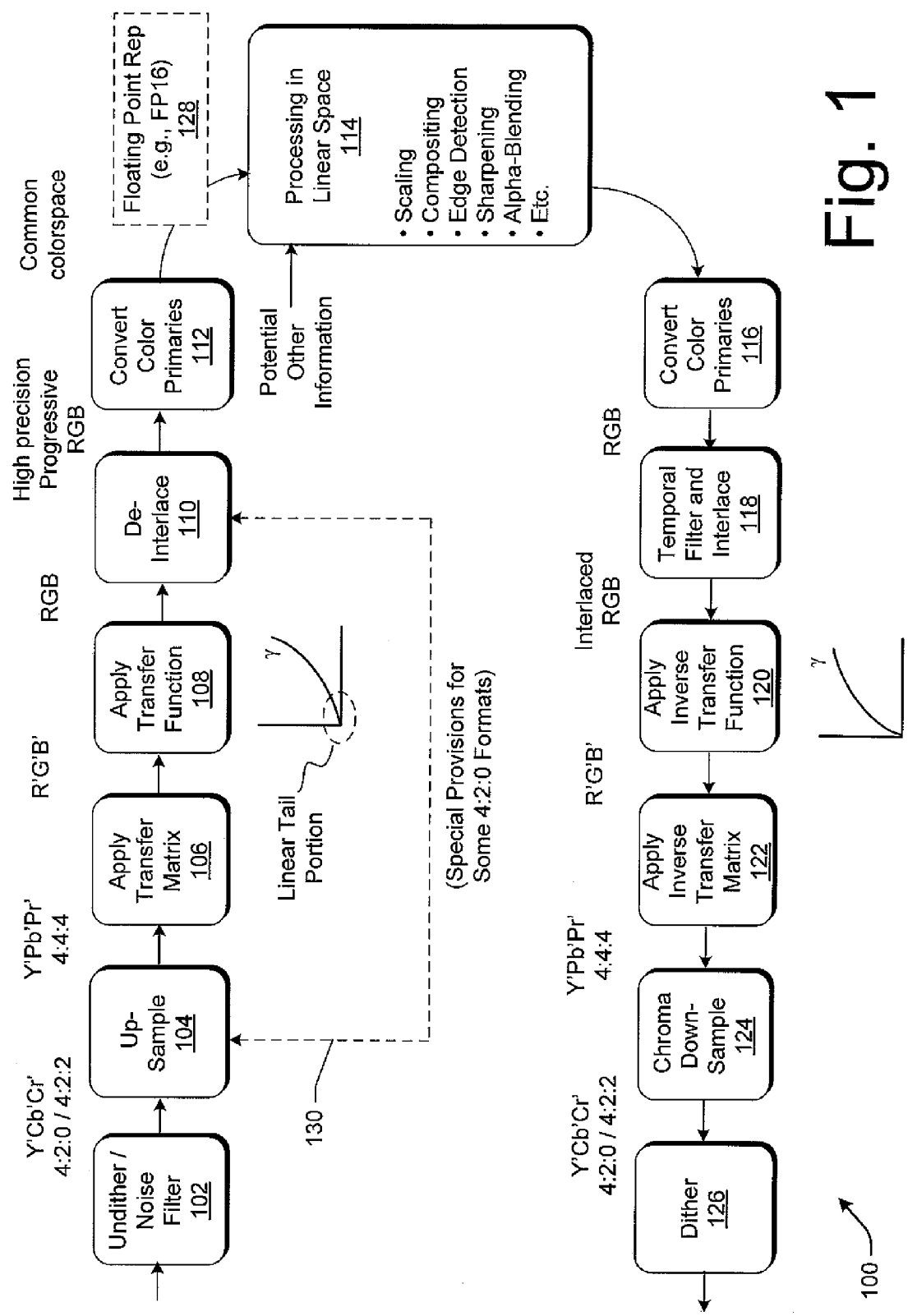
FIG. 1 shows an exemplary image processing pipeline involving the processing of image information in a linear format.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth various strategies for improving an image processing pipeline. The strategies propose new ways of processing image information based on a reconsideration of entrenched concepts in the art. A first class of improvements (described in Section A) can abstractly apply to any image processing pipeline. A second class of improvements (described in Section B) apply more specifically to certain technology-specific or implementation-specific applications of image processing pipelines.

According to one exemplary strategy, image information received by an image processing pipeline is converted into a linear form and then processed in that form. In one exemplary implementation, for instance, received luma-related image information (e.g., Y'CbCr) is converted into a linear RGB form and processed in that form. Exemplary processing tasks can include de-interlacing, resizing (scaling), compositing, alpha-blending, edge detection, sharpening, and so forth. Processing image information in linear space (as opposed to nonlinear space) has marked advantages, as it generally produces output results having reduced artifacts.

According to another exemplary strategy, image information is converted into a full channel (4:4:4) and high precision format and processed in that format, followed by subsequent quantization of the information to a lower precision. The higher precision information can be expressed in floating point format. Processing full channel and high precision information is advantageous because it produces output results having reduced artifacts, and can reduce degradation of chroma resolution as the information is processed in the pipeline.

According to another exemplary strategy, special provisions are provided for processing 4:2:0 interlaced image information. These special provisions provide ways of integrating an up-sampling operation with a de-interlacing operation. This strategy is beneficial for a number of reasons. For instance, this strategy better ensures that the 4:2:0 information will be processed correctly, e.g., without producing the so-called "chroma bug" processing artifact.

According to another exemplary strategy, special transfer functions can be applied for converting the image information into pseudo-linear space, rather than theoretically correct linear space. This is followed by performing processing on the image information in this pseudo-linear space using linear-type algorithms (without having to modify these algorithms to account for their application to nonlinear signals). This strategy is beneficial because it involves mathematical operations that can be performed more quickly using available processing hardware. This strategy also eliminates the need to alter image processing algorithms by incorporating error correction mechanisms into these algorithms. The aim of the error correction mechanisms was to minimize the negative effects of using linear algorithms to work on nonlinear data. However, the design and application of these error mechanisms often became more complex than the original processing algorithms.

According to another exemplary strategy, a unique error dispersion algorithm is applied. For each pixel in original image information, the algorithm quantizes a sum defined by an original image, noise information, and an error term. This yields a quantized value for that particular pixel. The algorithm then computes an error term for a subsequent pixel to be processed by computing the difference between the quantized value and the original value. This strategy is superior to know strategies in the art which essentially add noise to the original image information, and quantize the noisy image information; these known techniques then compute the error term with reference to the noisy image information, rather than the original image information. Thus, unlike the strategy disclosed herein, the known techniques degrade the original image information in proportion to the noise information added thereto. As another improvement, the strategies described herein use a noise generator having a sufficiently long repeat period and sufficiently "noise-like" pseudorandom characteristics so that the noise generator itself does not produce artifacts in the destination image information.

According to another strategy, a variation of a Catmull-Rom filter is used to perform scaling operations. The strategy involves calculating the number of filter kernels required to resize image information and the number of taps required by each kernel, and then pre-calculating the filter kernels. These filter kernels are then applied to image information. More specifically, the kernels can be cyclically applied to rows and columns of the image information. This strategy is advantageous for a number of reasons. For instance, the use of dynamically-computed filter kernels reduces some of the artifacts found in known applications. The pre-calculation of filter kernels is advantageous because it expedites the actual application of the filter. The judicious use of a minimal set of cyclically-applied kernels has additional efficiency-related advantages.

According to another strategy, functionality is described for generating code for implementing the image processing pipeline. The functionality receives requirements which specify what kinds of operations the pipeline is supposed to performed, and then selectively assembles code modules from a library of such modules to implement those functions. The functionality does not incorporate modules from the library that are not required. This strategy is beneficial for many reasons; for instance, it helps produce code tat is more efficient, and thus which potentially runs faster.

Finally, another strategy uses a graphics processing unit (GPU) to implement certain aspects of the image processing pipeline or all of the functions in the image processing pipeline. Particular implementations apply a pixel shader (a digital signal processor (DSP) within the GPU) to perform image filtering. In one case, one or more texture units of the pixel shader can be assigned to the weights of filter kernels, and one or more other texture units can be assigned to different delta-shifted versions of the same input image information (associated with the taps of the kernel). This strategy is beneficial because it potentially affords greater processing speed and processing capacity compared to a CPU implementation, due to the vector processing capabilities of pixel shaders.

Additional features and attendant benefits of the strategies will be set forth in this description.

As to terminology, the term "image information" is intended to encompass any kind of information that can be consumed by a user in any visual form. The image information can represent information expressed in any format, such as analog format, digital format, or a combination of digital and analog formats. The image information can represent still image information (e.g., digital photographs) and/or moving information (e.g., motion video information). Still further variations are contemplated by the use of the term image information.

The term "image processing pipeline" refers to any functionality for processing image information. A pipeline includes at least two functional components that operate on image information in series fashion, that is, one after the other, The term "linearization" refers to the conversion of image information from its nonlinear pre-compensated form to a linear form. The term "nonlinearization" refers to the inverse operation of linearization.

The term "luma-related image information" refers to image information have a brightness-related component (e.g., Y') and chroma components. The term "luma-related color space" refers to any one of plural standards for forming luma-related image information (e.g., Y'CbCr, etc.).

Generally, as to the structural aspects of the described subject matter, any of the functions set forth herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the term module, functionality, or logic represents program code that performs specified tasks when executed on a processing device or devices (e.g., CPU or CPUs). The program code can be stored in one or more fixed and/or removable computer readable memory devices.

As to the procedural aspects of this subject matter, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

This disclosure includes the following contents:

A. Exemplary General Improvements to a Video Processing Pipeline
   A.1. Processing of Image Information in RGB (Linear) Color Space
   A.2. Use of Floating Point Full Channel Image Information within the Pipeline
   A.3. Special Provisions for 4:2:0 Image Information
   A.4. Processing Image Information in Pseudo-Linear Space
   A.5. Improvements to Error Dispersion Algorithms
   A.6. Dynamic Calculation of Filter Kernels
B. Exemplary Implementation-Related Improvements to the Video Processing Pipeline
   B.1. Optimal Generation of Pipeline Processing Code
   B.2. General Use of GPU to Perform Image Processing
   B.3. Pixel Shader Related Improvements
C. Exemplary Computer Environment A. Exemplary General Improvements to a Video Processing Pipeline A.1. Processing of Image Information in RGB (Linear) Color Space FIG. 1 shows an exemplary image processing pipeline 100 for processing image information (e.g., video information). By way of overview, the top-most row of modules receive image information from any one of various sources (a camera, scanner, disc, storage media, digital network, and so forth) and then convert the image information into a form for processing. The large module in the middle of the figure represents such processing, which yields processed image information. The bottom-most row of modules converts the processed image information into whatever form is appropriate for output to a destination site (e.g., a television, computer monitor, storage media, digital network, and so forth).

There are several unique and advantageous aspects to the image processing pipeline 100, identified in separate subsections of this disclosure. This subsection will focus on the processing of image information in a linear form. Other improvements result from additionally processing the image information in a progressive (de-interlaced) form within the RGB color space. By contrast, a typical approach in the art is to perform processing of 4:4:4 or 4:2:2 interlaced Y'UV information. As appreciated by the present inventors, the processing of image information in nonlinear color spaces yields various artifacts. The approach embodied in the pipeline 100 of FIG. 1 overcomes these problems.

Each of the modules shown in FIG. 1 will be described in turn.

As to the top row of modules, an undithering module 102 converts received Y'CbCr image information having a first precision into image information having a second precision, wherein the second precision is higher than the first precision. Module 102 performs this task by performing an undithering-type processing. Namely, a dithering operation (not shown) may have been used to quantize the input image information that is fed to the pipeline 100 into the first precision. The module 102 effectively applies the inverse of these quantization operations to yield the second higher precision.

Up-sample module 104 transforms input image information having a first number of samples into output image information having a second number of samples, where the second number of samples is greater than the first number of samples. In a typical application, the image information has been received by the pipeline in a form in which there are more samples of luma information (Y') compared to chroma information (Cb or Cr); this is because the eye is more sensitive to luma information, making it possible to reduce the amount of chroma information relative to luma information without suffering noticeable degradation. The up-sample module 104 typically works to increase the number of chroma samples so that the chroma samples are on par with the luma samples. For example, the up-sample module 104 can convert 4:2:0 or 4:2:2 Y'CbCr image information to 4:4:4 Y'PbPr information. The up-sampling operation performed by the module 104 increases the number of samples by interpolating existing samples (thus effectively performing a scaling operation). Such interpolation techniques often must take specific account for how different standards position the chroma information relative to the luma information in order to provide accurate results.

The module 106 applies a matrix transformation to the 4:4:4 Y'CbCr image information to transform it into another color space, namely the R'G'B' color space.

The module 108 then transforms the nonlinear R'G'B' image information into a linear form by applying a transfer function to it. It bears repeating that the prime symbols (') associated with the R'G'B' image information indicate that it is in nonlinear form; the absence of the primes (e.g., RGB) usually denotes linear data (except that it is also commonplace to remove the primes where it is conventionally understood that the signals being referred to represent nonlinear information, as described above). The model transfer function shown in FIG. 1 below module 108 in FIG. 1 illustrates the general shape of the transfer function that is employed, which is also the general shape of the inherent transfer function of the CRT (not shown). This model transfer function also indicates that it can employ a linear tail near the V=0 portion of its curve to account for special considerations that apply in that "toe" region.

Module 110 optionally performs a de-interlacing operation on the image information to convert it from an interlaced form to a progressive format. In performing this task, the module 110 can be guided using either the RGB image information, or the original Y'CbCr image information (for the special case, for example, of 4:2:0 information). However, the de-interlacing operations should preferably be performed in the linear RGB space. This is because de-interlacing is actually a form of image processing (involving, for instance interpolation of existing samples); therefore, performing this processing in linear space will yield more accurate results.

Module 112 optionally transforms the color primaries of the linear RGB information to express the information in another color space. This conversion may comprise applying a matrix transformation to the RGB information to change its color primaries to correspond to whatever primaries are desired for processing performed in downstream components in the video processing pipeline. In one example, module 112 can convert various different types of image information into a common color space, which facilitates mixing this information together in a later operation.

Module 114 generally represents any kind of processing of the image information having the transformed color space. As this point, the processing acts on image information that is, in this specific example; a) in linear form; b) in the RGB color space; c) in 4:4:4 (full channel) form; and d) in progressive form. While it is preferred that the processing take place in a linear color space to reduce artifacts, all of the aspects enumerated in this list need not be present for the image processing pipeline to confer benefits.

In any event, module 114 can perform any kind of processing of the image information. Basically the processing encompasses any transformation of the image information, e.g., output image=SomeFunction(input image), including any kind of image filtering operation. A representative and non-limiting list of such processing operations includes: a) compositing; b) alpha-blending (e.g., various fades and dissolves); c) edge detection; d) sharpening e) resizing (scaling to larger or smaller image sizes); f) de-interlacing (if it has not been performed yet), and so forth. Compositing involves mixing one type of image information with another type of image information. For example the module 114 can be employed to combine graphics (e.g., text information) on top of video image information pulled off of a DVD disc. Alpha-blending involves blending colors together based on an alpha factor (which determines the degree to which one color blends into another). For example, the blending operation is governed by the following equation; Final color=source color*source blend factor+destination color*destination blend factor. In this equation, the destination pixel color represents the color of the pixel in the pre-existing scene, and the source pixel color represents the new pixel color that the blending engine intends to add to the destination pixel. The blending factors vary from 0 to 1 and are used to control how much contribution the source and the destination pixel colors have in the final color value. To repeat, these are merely representative examples of a large number of potential processing applications. Generally, many of the above-described video processing applications apply an affine weighting to transition between source and target image information. In these kinds of applications, the use of nonlinear weighting can cause the overall brightness of the image information to decrease too quickly. This is merely one example of an artifact which the present solution can eliminate or reduce by virtue of its processing of linear image information.

The bottom row of modules in FIG. 1 generally reverses the above-described operations in the top row. Namely, after processing in module 114, module 116 optionally converts the image information into another color space, such as back to the RGB color space. Module 118 applies an optional re-interlacing of the image information if it needs to be stored or displayed in an interlaced form Module 120 applies a transfer function to again transform the RGB image information into a nonlinear form (R'G'B') (if appropriate). Module 122 changes the color space of the R'G'B' image information back into a format which separates its luma component (Y') from its chroma components (e.g., PbPr). Module 124 optionally sub-samples the Y'PbPr image information to reduce the amount of chroma samples (PbPr) relative to the amount of the luma samples (Y'). That is, this module 124 can transform Y'PbPr 4:4:4 image information (where there is a chroma sample for every luma sample) into Y'PbPr 4:2:2 or 4:2:0 image information (where there are fewer chroma samples relative to luma samples). Finally, module 126 applies a quantization operation to the image information. The quantizing operation has the effect of converting the image information to a lower precision to facilitate efficient transfer over a network, storage, display, and so forth. The quantizing operation can be coupled with a dithering operation in order to reduce artifacts that might otherwise be caused by the rounding off errors produced by the quantization. As will be explained in further detail in a later subsection, the dithering operation has the effect of spreading these errors to neighboring pixels as the image information is being processing, therefore mitigating the effects of the artifacts.

Figure 2:
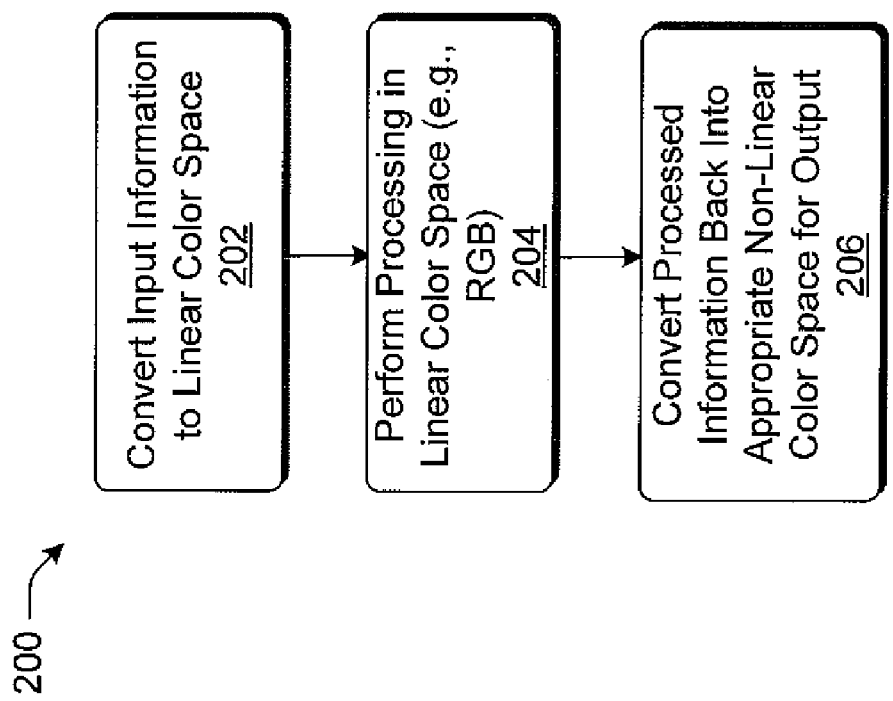
FIG. 2 shows an exemplary procedure for processing image information in a linear format using the image processing pipeline of FIG. 1.

FIG. 2 shows a procedure 200 which summarizes the above-described operations in flowchart form. Step 202 involves converting the input image information into a linear a color space, such as RGB. The information is also preferably de-interlaced into progressive form, and up-sampled to 4:4:4 (full channel) format. Step 202 thus corresponds to the top row of modules in FIG. 1.

Step 204 entails performing any kind (and combination) of processing tasks on the image information in its linear form.

Step 206 represents converting the processed linear image information into whatever output format is demanded by a particular application. This may involve converting the processed linear image information into a nonlinear color space, re-interlacing it, down-sampling it, quantizing it, and so forth. Step 206 corresponds to the bottom row of modules in FIG. 1.

A.2. Use of Floating Point Full Channel Image Information Within the Pipeline

Returning to FIG. 1, the pipeline 100 also provides superior results to known strategies because it uses (a) full channel image information (i.e., 4:4:4) having (b) relatively high procession with (c) optionally linear semantics. More specifically, as described above, the pipeline 100 converts the image information that it receives to a higher precision than its original form. The pipeline 100 also convert the image information to fill channel form (4:4:4) by increasing the amount of chroma samples in the information relative to the luma samples. Various processing tasks are then performed on the high precision and full channel image information. After the processing has been performed, the pipeline 100 can optionally convert the processed image information into a lower precision sub-sampled form once again.

Generally, the conversion of image information into a high precision and full channel form effectively amplifies the signal component of the information relative to the noise component of the information, thus enabling processing that is performed on this information to yield more accurate results. By contrast, known strategies which fail to use high precision and/or full channel image information at various intermediate junctures in the pipeline can propagate errors along the pipeline and can reduce the resolution of the image information (by essentially losing color content). FIG. 1 generally denotes the processing of high precision and full channel image information by the information block labeled 128 that feeds into the processing module 128 (although other modules in this figure can also benefit from processing of information in high precision and full channel form, such as the de-interlacing module 110).

An example will render the discussion more concrete. Consider the advantage of working in high precision linear RGB image information, compared to normal precision 4:2:0 or 4:2:2 Y'UV image information. Recall that 4:2:0 and 4:2:2 image information provides one half and one quarter (respectively) of the amount of chroma information relative to the amount of luma information. Typically high definition (HD) image information (in particular 1920×1080i, 2.07 mpixels) is downscaled to 1280×720p (0.92 mpixels) or 720×480p (0.35 mpixel) resolutions. If a pipeline performs a downscaling operation in this context in the 4:2:0 subsampling format (e.g., 1920×1080 to 1280×720), then the pipeline downscales 2.07 mpixels of luma information and 0.52 mpixels of chroma information to 0.92 mpixels of luma information and 0.23 mpixels of chroma information. However, if the pipeline first up-samples to 4:4:4, then converts to high precision RGB (e.g., float), then downscales, and then converts to 4:4:4 YUV, the pipeline will effectively retain 0.92 mpixels of luma information and 0.52 mpixels of chroma information. In other words, the use of high precision processing in this context allows the pipeline to retain almost all of the original chroma information.

One way to achieve high precision intermediate image information is to use floating point format to represent the information. Floating point numbers have mantissa components and exponent components. The exponent component defines how the mantissa component is to be shifted. With this format, floating point information can express very low values to very high values by shifting the representation of the information accordingly (e.g., by changing the exponent component). Any kind of floating point representation can be used having any number of bits, including a 16 bit floating point representation, a 32 bit floating point representation, and so forth. A particularly apt form of floating point for use in the image processing pipeline 100 is the so-called FP16 floating point format, although other kinds of floating point representations can be used.

A.3. Special Provisions for 4:2:0 Image Information

Figure 3:
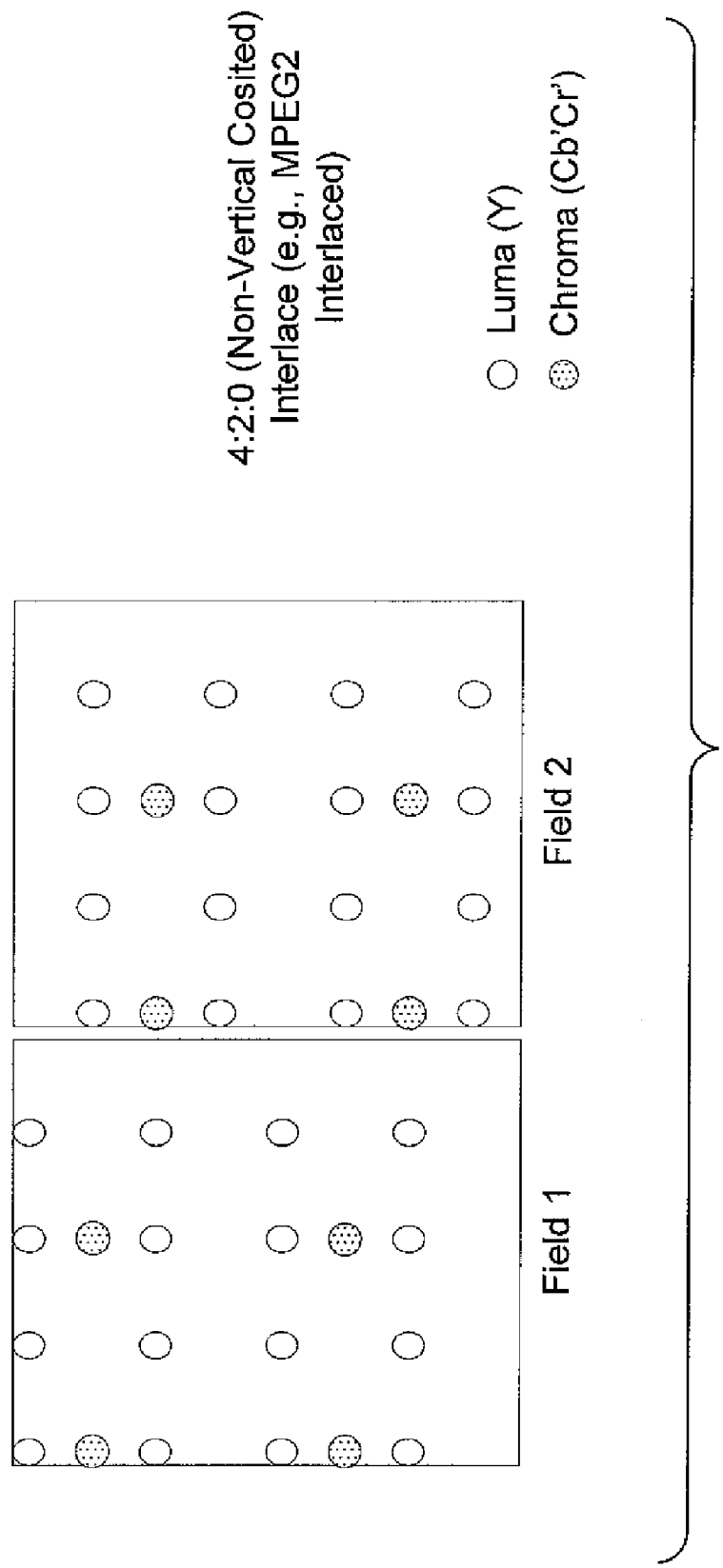
FIG. 3 shows a sample of 4:2:0 image information as a vehicle for discussing some of the challenges in processing this information without incurring artifacts.

To review, as explained in the Background section, 4:4:4 image information includes four samples of Cb and Cr for every four samples of Y'. 4:2:2 image information includes two samples of Cb and two samples of Cr for every four samples of Y'. 4:2:0 image information includes half as many samples of Cb and Cr on each scan line, and half as many scan lines of Cb and Cr as there are of Y'. In other words, the resolution for chroma information is half that of the luma information in both the horizontal and vertical directions. For example, if the full image resolution is 720×480, then the chroma information is only stored at 360×240. In 4:2:0, not only must missing samples be interpolated on each scan line, but entire scan lines of chroma information must be interpolated from the scan lines above and below. FIG. 3 shows an example of MPEG2 interlaced 4:2:0 image information. Further information regarding the processing of 4:2:0 image information can be found in Don Munsil and Stacey Spears, "The Chroma Up-sampling Error and the 4:2:0 Interlaced Chroma Problem," DVD Benchmark, April, 2001 (December, 2002, updated January, 2003).

The scarcity and positional alignment of chroma information in 4:2:0 image information introduces a number of challenges in processing this information. Speaking generally, problems may arise because one stage in the processing pipeline 100 requires the analysis of another stage in the processing pipeline 100 in order to interpret the 4:2:0 image information correctly. Consider the example of the up-sampling module 104 and matrix transformation module 106 of FIG. 1. In order to interpret the 4:2:0 image information correctly, the up-sampling module 104 optimally requires knowledge regarding how the color information is expressed in the image information, which is information that is provided by the de-interlacing module 110. But since the de-interlacing module 110 is located downstream relative to the up-sampling module 104, this knowledge is not available to the up-sampling module 104. If modules 104 and 106 process the 4:2:0 information without the benefits of de-interlacing analysis, they may produce errors in the image information which may be difficult or impossible to correct. This difficulty ultimately ensues from the fact that the scan lines in 4:2:0 cannot be treated independently from each other in de-interlacing analysis (unlike, for example, 4:2:2 image information).

To address this challenge, the pipeline 100 of FIG. 1 can incorporate special provisions for handling 4:2:0 image information. As a general provision, the pipeline 100 can be modified so that analysis performed at different stages (and information available at different stages) is shared more widely to other stages in the pipeline, rather than requiring each stage to atomistically analyze only whatever information is fed to it by a preceding stage.

With specific regard to the problem caused by the position of de-interlacing module 110 in the pipeline 100, the pipeline 100 can be modified so that de-interlacing analysis (performed by module 110) is performed earlier, e.g., in conjunction with up-sampling analysis (performed by module 104). FIG. 1 illustrates this tactic by dashed line 130. Alternatively, the de-interlacing module 110 can perform de-interlacing analysis by also examining the original input image information that was fed to the up-sample module 104. Namely, the de-interlacing module 110 can perform analysis on the output of module 108 in combination with the original image information to gain a better understanding of how the image information should be de-interlaced.

Still further module-integrating provisions can be devised to share the analysis performed separately by individual modules within the pipeline 100, to thereby more effectively address the paucity of chroma information in 4:2:0 image information.

4.4. Processing Image Information in Pseudo-Linear Space

The preceding sections addressed the goal of designing an image processing pipeline that yields few artifacts. However, image processing pipelines should also provide output results in an efficient manner. An image processing pipeline produces results in an efficient manner when it does so with sufficient speed and with an acceptable number of processing resources. To this end, this subsection proposes various approximations that can be applied to the pipeline 100 shown in FIG. 1 to reduce the complexity of the pipeline 100.

Namely, this subsection proposes modifications to the pipeline 100 shown in FIG. 1 so that it provides image information that is nearly linear, but not completely linear. As a result, these transformations are said to transform the image information into a "pseudo linear" space, rather than a theoretically correct linear space. The advantage is that the hardware implementation of the mathematical operations required by the transfer functions (in modules 108 and 120) can be greatly simplified, resulting in much quicker and more efficient processing of the image information. More specifically, the chosen operations typically execute an order of magnitude faster than their original counterpart functions (which are more mathematically precise). The negative impact of processing image in pseudo-linear space is minimal because the pseudo-linear image information is nearly linear.

Thus, any algorithm of a linear nature can be applied to this information without modification to provide satisfactory output results for most applications.

Figure 4:
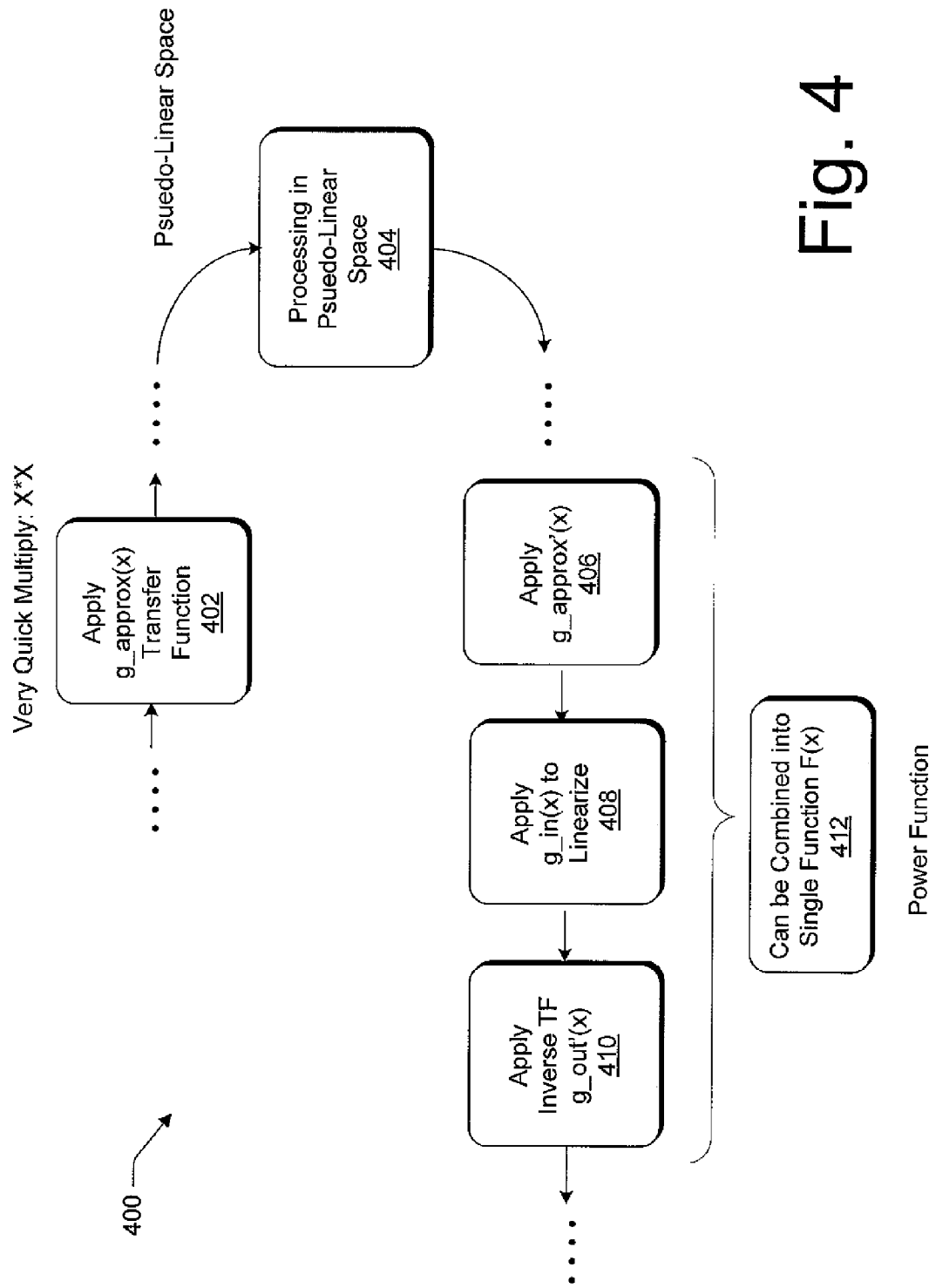
FIG. 4 shows an exemplary portion of an image processing pipeline that accommodates the processing of image information in a pseudo-linear form.

FIG. 4 provides more information regarding the above-described approximation. More specifically, FIG. 4 represents a modification of only certain modules of the processing pipeline 100 of FIG. 1, and therefore only contains an abbreviated depiction of the full processing pipeline 100 shown in FIG. 1.

The pipeline excerpt 400 shown in FIG. 4 includes a transfer function module 402 which replaces the transfer function module 108 of FIG. 8. Instead of applying a mathematically precise transformation of the image information to convert it to linear space (as does module 108), the module 402 applies an approximation transfer function (g_approx(x)) that converts the image information into the above-described pseudo-linear space. This module 402 resorts to the g_approx(x) transfer function because it is "cheaper" than the more precise transfer function required by module 108 of FIG. 1.

Module 404 represents the counterpart of processing module 114 of FIG. 1. Module 404 performs any number of processing tasks on the pseudo-linear image information in the pseudo-linear processing space.

Modules 406, 408 and 410 then perform the task of converting the processed image information into a format suitable for output (e.g., to a display, storage device, network target site, and so forth). Module 406 is specifically tasked with the responsibility of removing the effects of module 402 by applying the inverse of its operation, namely g_approx'(x). Module 408 then linearizes the output of module 406 by applying a transfer function g_in(x); this operation is performed because the next stage 410 is designed to accept linear input. Then, the module 410 applies the inverse transfer function (g_out'(x)) to yield the final gamma-corrected output image information to suit whatever output format is required. In an actual implementation, modules 406, 408 and 410 can be integrated into a single transformation, represented by F(x), performed by module 412.

Importantly, the algorithms that are applied in the pseudo-linear color space by module 404 are the same as the algorithms that are applied to the "correct" linear color space in module 114 of FIG. 1; in other words, the processing strategy represented by FIG. 4 does not require special tailoring of the image processing algorithms themselves. In contrast, the approach taken by known prior strategies is to perform processing in whatever nonlinear space the image information is received in and then apply various ad hoc and application-specific correction factors to the algorithms to attempt to patch up any artifacts. However, these corrections factors were often inaccurate, and, in any event, is typically complex. More generally, prior techniques did not apply a comprehensive and generally-applicable approach to converting information into pseudo-linear form, and then removing this pseudo-linear form in the manner described above.

The remaining discussion in this subsection sets forth exemplary approximations that can used to implement the above-described modules in FIG. 4. To begin with, note that the transfer functions used to perform gamma processing are typically power functions (e.g., $x^{0.45}$ or the inverse of $x^{1/0.45} \approx x^{2.222}$), or a combination of several functions. Power functions are typically very costly to compute on a per pixel basis using available hardware.

However, note that $x^{0.45}$ is approximately equal to the square root of x, or in other words, $x^{0.45} \approx x^{0.50}$. And $x^{1/0.45}$ is approximately equal to $x^2$ or in other words, $x^{1/0.45} \approx x*x$. Optimized hardware exists for calculating $x^{1/2}$ which is quicker than the operations required by a general power function (often by an order of magnitude). And the hardware can perform the square $x^2$ very quickly, as this is simply a multiply operation. Therefore, these approximations can markedly cut the processing costs associated with implementing the transfer functions.

More formally, the function g_approx(x) performed by module 402 can take the form of $x^2$*sign(x), and the inverse transfer function performed by module 406 can take the form of $(abs(x))^{1/2}$*sign (x). (Note that as a special consideration, the transfer functions and inverse transfer functions may apply a linear tail segment near zero.)

The above approach can be generalized to different input and output gamuts, represented by the functions g_in(x), and g_out(x), using the following exemplary series of operations:

1) Apply the inverse linear approximation g_approx(x)= $x^2$=x*x to the image information. Module 402 can perform this step.

2) Process the data in the pseudo-linear space. Module 404 can perform this step.

3) Apply the linear approximation g_approx'(x). Module 406 can perform this operation.

4) Apply the transfer function g_in(x) to linearize the output of module 406. Module 408 can perform this operation.

5) Apply the inverse transfer function g_out'(x) to the output of module 408 to produce information in the desired g_out space.

Steps (3)-(5) can be merged into a single function, F(x), namely:

$$F(x)=g\_out'(g\_in(g\_approx'(x))).$$

If the pipeline converts between a gamma of 2.222 to a gamma of 2.4, then the function F(x) can be expressed as:

$$F(x) = \left(\left(x^{0.5}\right)^{1/0.45}\right)^{1/2.6} = x^{0.426}.$$

The cost of the above algorithm involves one very "cheap" conversation required by the g_approx(x) function, followed by the processing of the information in the pseudo-linear space, followed by one potentially expensive conversation required by the F(x) i function. But since the equation F(x) simply demands multiplication of exponents, the cost of this function is no worse than the original inverse function. Therefore, the solution shown in FIG. 4 has net effect of potentially reducing the cost of the full linearization/nonlinearization cycle by approximately half. And as stated above, this solution is advantageous in the sense that it does not require special customization of the algorithms performed by the module 404.

Figure 5:
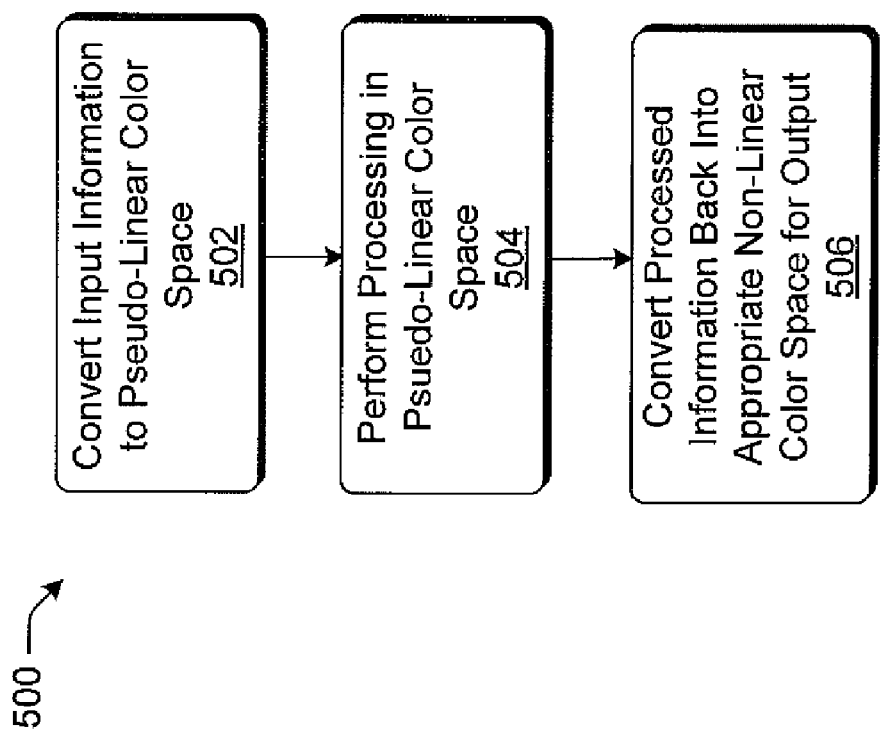
FIG. 5 shows an exemplary procedure for processing image information in a pseudo-linear form using the image processing pipeline portion shown in FIG. 4.

FIG. 5 shows a procedure 500 which summarizes the operations described above, and is a counterpart to the linearization procedure 200 shown in FIG. 2. Step 502 entails converting the input image information into the pseudo-linear space. Step 504 entails performing processing on the image information in the pseudo-linear space using module 404. And step 506 entails converting the processed information into an appropriate nonlinear color space for output.

A.5. Improvements to Error Dispersion Algorithms

The quantization of high precision image information into a lower precision format may introduce errors, as the approximations required by the quantization can lead to artifacts if not handled correctly. Various error dispersion algorithms act to disperse the errors caused by quantization, and therefore minimize the artifacts. Such error dispersion is a form of dithering.

Figure 6:
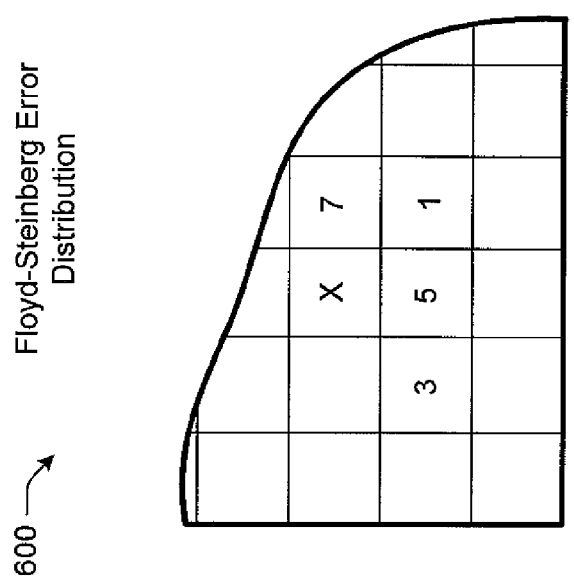

FIG. 6 shows the known application of a Floyd-Steinberg algorithm to disperse errors caused by quantization. Consider point X in an image, which represents a pixel (or more generally, a picture element) in the image. Quantization of that picture element X will produce an error difference, computed as the difference between the high precision representation of the picture element and the value that it is quantized into. The Floyd-Steinberg algorithm divides this difference into different components, and then distributes these components to the picture elements that neighbor element X (and that have not yet been processed by the algorithm). When processing advances to such a neighboring picture element, the error components previously dispersed to this picture element will be added thereto, and this picture element will then be processed in the manner described above, e.g., by quantizing it, calculating another error difference, and dispersing this error to neighboring picture elements. Processing of the entire image can proceed in various ways, such as by left-to-light and bottom-to-top.

The Floyd-Steinberg algorithm assigns different weights to the error components that it disperses to neighboring picture elements. FIG. 6 shows weights of 7, 1, 5 and 3 assigned to the picture elements that neighbor element X (in clockwise order). More precisely, the weighting factors applied to the error components are 7/16, 1/16, 5/15 and 3/16, where the denominator of "16" reflects the total of the weights assigned to neighboring picture elements.

However, error dispersion algorithms, such as Floyd-Steinberg, sometimes produce destination images having various artifacts. Such artifacts can manifest themselves in visually discernable patterns which are particularly noticeable with certain image content. Known strategies have addressed this problem by adding random noise to the original image to obfuscate the patterns caused by the error dispersion algorithms. But this remedy may itself have various deficiencies. First, known techniques add the noise to the original image, and then quantize the noisy original image as the baseline (in the manner more carefully described below). While this technique does have the effect of obscuring the artifacts caused by the error dispersion algorithm, it also degrades the final destination image. Namely, the noise in the destination image increases in proportion to the noise added to the original image. Second, known strategies may add noise using noise generators having a relatively short repeat period. Hence, the noise generators may produce their own pattern-type artifacts which may be visually discernable in the destination image (along with, possibly, some vestige of the error dispersion artifacts that the noise generator was designed to mask.)

Figure 7:
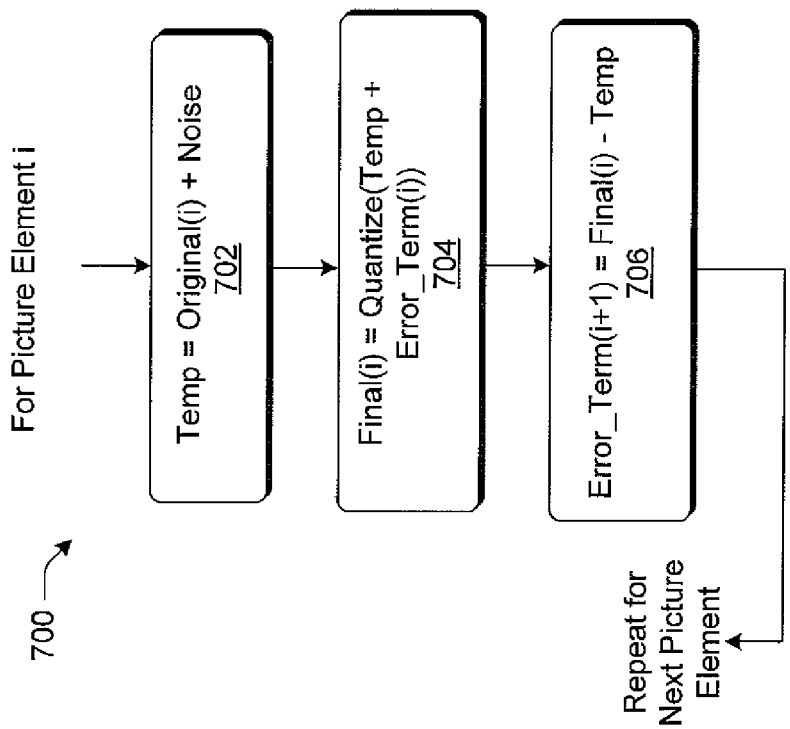
FIGS. 6 and 7 together explain known approaches to performing dithering and error dispersion.

FIG. 7 shows a procedure 700 which more specifically explains the former of the above-identified problems. The object of the procedure 700 is to quantize original image information ("Original") to produce destination image information ("Final") using an error distribution algorithm. Step 702 entails producing "Temp" image information by adding the noise information to the original image information for an image element i (e.g., a pixel). Step 704 entails producing the Final image information by quantizing a sum defined by the Temp image information and the "Error_Term(i)" image information. The Error_Term represents the error component added to the picture element i based on a previous quantization of an earlier-processed picture element or elements. Step 706 entails defining the next Error_Term component (to be applied to a future picture element to be processed) as the thus-computed Final image information minus the Temp image information. Application of the algorithm has the net effect of essentially quantizing a noisy image, with the consequent drawbacks set forth above.

FIG. 8 shows a system 800 which overcomes the above-noted problems in the art. A dithering module 802 transforms original image information 804 into destination image information 806 using an error dispersion algorithm. The error dispersion algorithm comprises the Floyd-Steinberg algorithm discussed above, but is not limited to this algorithm. A noise generator 808 interjects random noise into the quantization process to help obscure some of the artifacts produced by the error dispersion algorithm.

The system 800 differs from known strategies in at least two respects. First, the system 800 essentially adds the noise information to the quantization process, not the original image information 804. In other words, the original image information 804 remains the baseline from which the error terms are measured, rather than, in prior techniques, the original image plus the noise information. Thus, increasing the amount of noise in the system of 800 will not necessarily have the effect of progressively making the destination image information 806 more noisy to the eye; this is because the error terms that are propagated to neighboring picture elements retain a measure of the deviation of the destination image information 806 with respect to the original image information 804, and thus the error dispersion algorithm is continually trying to correct for the effects of the random noise added to the quantization process.

FIG. 9 shows a procedure 900 which explains the above processing. Step 902 involves producing final image information for a picture element i by quantizing a sum of the original image information, the noise information, and the error term for picture element i. Step 904 entails computing the error term to be dispersed to a neighboring picture element (or elements) by computing the difference between the final image information and the original image information for picture element i.

An example will render the discussion more concrete. Assume that the task is to quantize a picture element having the value 23.3 to the nearest integer. Assume, in the known strategy shown in FIG. 7, that +0.4 amount of noise information is added to the value, making it 23.7. The final image value for this picture element would be 24, and the error term that is propagated would be −0.3 (the difference between the final output image value and the noisy image value, 23.7). In the improved strategy of FIG. 9, by contrast, the error term that is propagated would be −0.7 (the difference between the final output image value and the original image value).

A more formal description of the above technique is set forth below, based on an application of the Floyd-Steinberg error dispersion algorithm. For each pixel in an image, the task of the algorithm is to quantize a high-precision value V and store it in a pixel position P(x, y) of a pixel array P, where P(x, y) has lower precision than V. Error terms produced by the algorithm are stored in a high-precision error array E having the same size as the pixel array P. The error term for a pixel P(x, y) is stored in a corresponding location in E(x, y). The function "round( )" in the algorithm rounds a high-precision number to the nearest low-precision number. The function "random( )" in the algorithm returns a random high-precision number in the range {−0.5 . . . 0.5}. The temporary values "Desired" and "Error" are high-precision values. The actual error propagation coefficients are from the Floyd-Steinberg error propagation algorithm.

Algorithm 1: Improved Error Dispersion
For each pixel x, y:

Desired=$V$+$E(x, y)$ $P(x, y)$=round (Desired+random( ))

Error=Desired−$P(x, y)$ $E(x+1, y)$=Error*7/16

$E(x−1, y+1)$=Error*1/16

$E(x, y+1)$=Error*5/16

$E(x+1, y+1)$=Error*3/16

End

As a second improvement, the noise generator 808 employs a relatively long repeat pattern, unlike known approaches. The phrase "relatively long" can be interpreted in relative terms by mandating that the noise generator 808 not repeat its numbers when processing an entire frame of image information, or at least not repeat itself to the extent that it yields noticeable artifacts in the destination image information 806. One particular random number generator that will meet this requirement is the so-called R250 random noise generator.

A.6. Dynamic Calculation of Filter Kernels

Scaling filters can be used at various junctures in the pipeline 100 shown in FIG. 1 when the image information is resized from a source size to a destination size. For instance, the processing performed in module 114 can involve the scaling of the image information either up or down, depending on the application, and/or depending on control signals input by a user. Scaling may also be performed at other junctures in the pipeline 100, such as in sampling modules 104 and 124.

A number of filtering algorithms can be used in conjunction with scaling algorithms. One particular known type of filter is a so-called Catmull-Rom filter. Application of this kind of filter to the task of resizing image information will result in the sharpening of edges in the image information to some extent.

This subsection describes a filter used for scaling (such as a Catmull-Rom type filter, but not limited to this kind of filter) that can be computed and applied on a pixel-by-pixel basis to image information. This can be conceptualized as the dynamic computation and application of a separate filter for each pixel in the image information. Each filter may include one or more kernels, and each kernel may have one or more taps. The kernel defines weights that are applied to pixels in the image information. The taps define image information samples that the kernel acts upon. Failure to calculate and apply the filter kernels in this manner can result in various artifacts in the destination image, such as beat patterns.

However, the calculation of separate filter kernels for each pixel may be prohibitively expensive in terms of the amount of time involved to compute the kernels. This might preclude real-time presentation of the image information on some hardware. To address this problem, this subsection defines efficient strategies for dynamically computing filter phase kernels for entire rows or columns of input image information, and then applying such kernels. By way of overview, the strategies involve calculating the number of kernels required for a row (or column) of the original image information calculating the number of taps required by the kernels, allocating a storage array for storing the kernels, and calculating and storing of the required number of kernels in the array. These steps are followed by applying the filter kernels stored in the array to the image information.

The algorithm is efficient because the kernels are calculated in advance of their application. Also, computational savings are achieved because, in certain instances, a relatively small number calculated kernels can be cyclically applied to a much larger row or column of the image information. And the same kernels applied to a particular row or column can be applied to other rows and columns (respectively) in the image information. In other words, depending on the resizing requirements of a particular application, it is not necessary to compute a separate filter for every single pixel in the image information.

Figure 10:
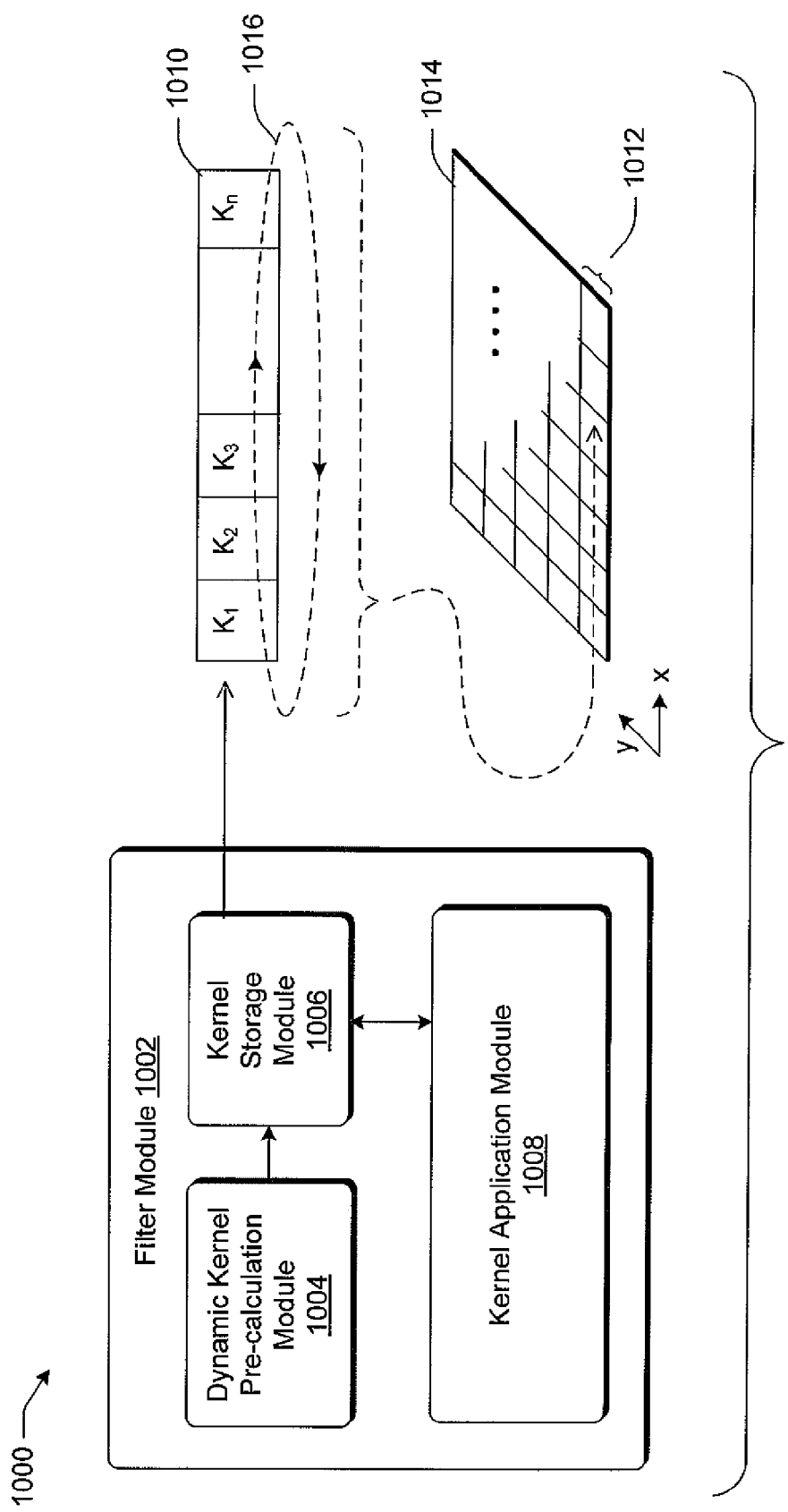
FIG. 10 shows an exemplary system for providing filtering when performing scaling, involving the dynamic calculation of filter kernels.

FIG. 10 shows an overview of a system 1000 for implementing a filter module 1002 of the above-described design. The filter module 1002 includes a dynamic kernel pre-calculation module 1004. The purpose of this module 1004 is to first compute the number of kernels required for a particular scaling operation and the number of taps required for the kernels. The number of kernels and taps will depend on the manner that the image information is being resized (in the manner described below). Then the pre-calculation module 1004 pre-calculates the desired number of kernels and stores the kernels in a storage module 1006. A kernel application module 100 then applies the kernels in the kernel storage module 1006 to the image information to achieve the desired filtering behavior. As mentioned above, calculation of the kernels in advance of their application helps makes the filtering process run more quickly. Moreover, the complexity of the filter calculation is reduced to a very great extent for those scaling operations that only require the pre-calculation of a few kennels.

The right-hand portion of FIG. 10 shows how the kernels 1010 can be iteratively applied to a particular row 1012 of image information 1014. The kernels 1010 are applied in series and in cyclical fashion (where, in one exemplary case, each kernel is applied to one output pixel). For example, if there are a small number of kernels for a relatively long row of image information, then these kernels are applied in succession and repeated over and over as the row of image information is processed. That is, the pre-stored kernels form a list; they are applied one after the other to the row, and when the last kernel is encountered in the list, processing continues by wrapping around and again drawing from the top of the list. The iterative behavior of the application technique is represented by the loop 1016 shown in FIG. 10. The kernels 1010 can be applied to other rows in a similar manner. Moreover, similar processing can be repeated with respect to kernels that apply to the columns of the image information 1014.

An exemplary algorithm that can be used by the module 1004 to calculate the number of kernels and taps is set forth below. The module 1004 applies the algorithm separately to scaling in the x and in y dimensions of the image information 1014. Thus, although the algorithm is set up to scale in the x dimension, the algorithm is also applicable to the y dimension, e.g., by changing references to width to height, and so forth. In the x dimension, the "ScaleRatio" used in the algorithm defines the ratio of the original image width to the desired final (target) image width. The "ceiling" function used in the algorithm rounds a real number to the next higher integer. The "gcd" function in the algorithm calculates the greatest common denominator of two integers.

Algorithm 2: Calculation of the Number of Kernels and Taps

ScaleRatio=SourceWidth/DestinationWidth if ScaleRatio<1.0

ScaleRatio=1.0

Taps=ceiling(ScaleRatio*4)

if Taps is odd

Taps=Taps+1

Kernels=DestinationWidth/gcd(SourceWidth, DestinationWidth)

As an example, consider the vertical scaling of source image information having a height of 720 pixels to destination image information having a height of 480 pixels. Application of the above algorithm to this scenario yields:

ScaleRatio=720/480=1.5

Taps=ceiling(ScaleRatio*4)=6

Kernels=480gcd(720, 480)=480/240=2

Thus, the module 1004 needs to pre-calculate and pre-allocate 2 kernels of 6 taps each. The resizing operation will alternate in ping-pong fashion between the two kernels as it moves along a row of pixels.

As another example, consider the vertical scaling of source image information having a height of 721 pixels to a destination image information having a height of 480 pixels. Application of the above algorithm to this scenario yields:

ScaleRatio=721/480=1.5021

Taps=ceiling(ScaleRatio*4)=7

Taps is odd, so we add one, which yields 8

Kernels=480/gcd(721,480)=480/1=480

Thus, the module 1004 needs to pre-calculate and pre-allocate 480 kernels of 8 taps each. The resizing operation will use a unique kernel for every one of the 480 output pixels. However, significant savings will still be realized because the same set of 480 kernels can be used in every vertical column of pixels. Also, in real-world practical cases, the ratio between the destination and source sizes tends to he a fairly simple ratio, making the resultant number of kernels required a manageable number. Special restraints can also be imposed that will prevent users entering resizing requests that demand a particularly large number of filter kernels (e.g., in excess of a prescribed threshold).

Figure 11:
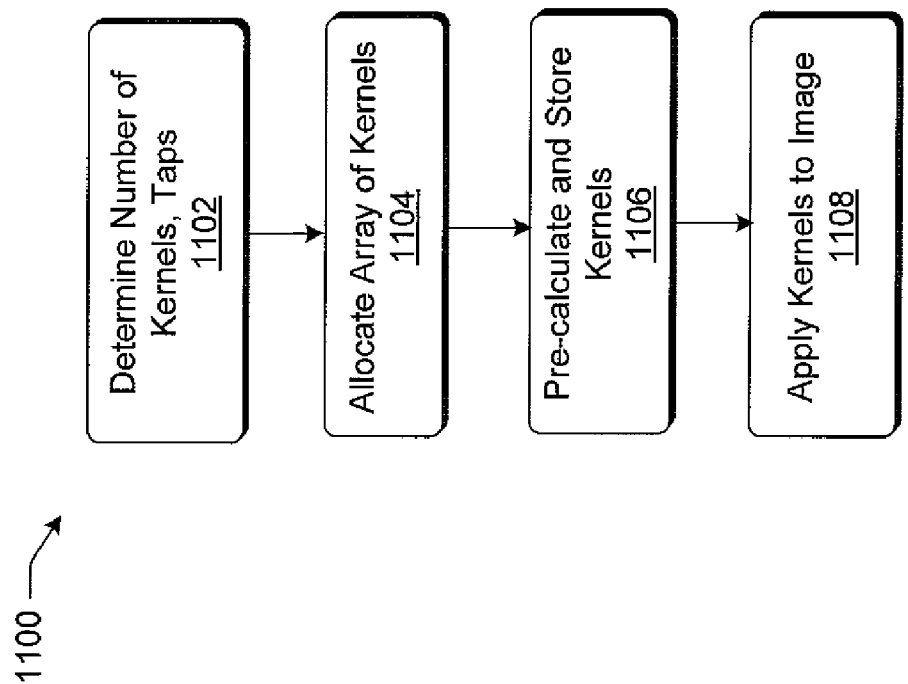
FIG. 11 shows an exemplary procedure for performing filtering using the system of FIG. 10.

FIG. 11 shows a procedure 1100 which summarizes the above-described operations. Step 1102 involves determining the number of kernels (and taps per kernel) required to achieve a desired resizing of an image in the horizontal and/or vertical dimensions. The pre-calculation module 1004 can perform this task using the algorithm provided above. Step 1104 involves allocating space in the kernel storage module 1006 to store the number of kernels calculated in step 1004. Step 1106 involves actually pre-calculated and storing the kernels. And step 1108 involves applying the pre-calculated kernels stored in the storage module 1006 to image information. The application proceeds by cyclically sequencing through the kernels while processing any given row or column.

B. Exemplary Implementation-Related Improvements to the Video Processing Pipeline B.1. Optimal Generation of Pipeline Processing Code The following section provides a number of implementations of the video processing pipeline 100 of FIG. 1 of a more technology-specific nature compared to Section A. To begin with, FIG. 12 shows a high-level overview of an image processing pipeline 1200 that will serve as a foundation for discussing the improvements of this section.

Figure 12:
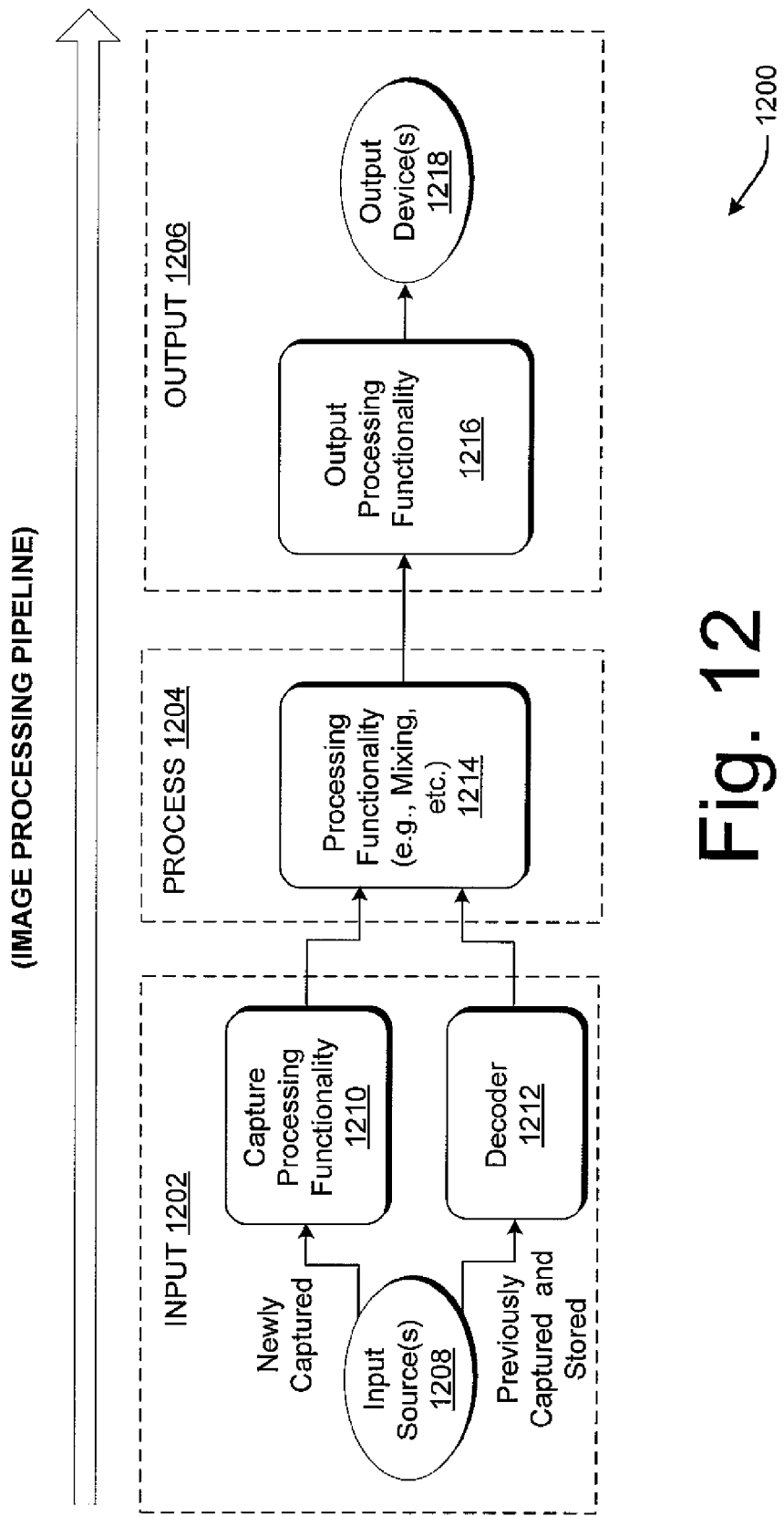
FIG. 12 shows an exemplary image processing pipeline that can incorporate any of the improvements described herein.

The pipeline 1200 shown in FIG. 12 includes processing stages defined by an input stage 1202, a processing stage 1204 and an output stage 1206. As to the input stage 1202, input source 1208 represents any source of image information. The source 1208 can generally comprise newly captured image information (e.g., created by a camera or scanner), or previously captured image information that is presented to the input stage 1202 via some channel (e.g., received from a disc, over an IP network, etc.). In the former case, capture processing functionality 1210 can perform any kind of preliminary processing on the image information received from the source 1208. In the latter case, the decoder functionality 1212 performs any kind of stream-based information extraction and decompression to produce image data. Generally, such processing, can include separating image information from audio information in the received information, uncompressing the information, and so forth. As to the processing stage 1204, processing functionality 1214 performs any kind of processing on the resulting image information, such as mixing multiple streams of image information together into a composite signal. As to the output stage, output processing functionality 1216 represents any kind of processing performed on the processed image information in preparation for its output to an output device 1218. Output device 1218 may represent a television, a computer monitor, and so forth. Output devices may also represent storage devices. Further, an output "device" (or output functionality 1216) can provide compression and formatting functionality (such as multiplexers) that prepare the information for storage on a device, or for distribution over a network.

Generally, the processing operations set forth in FIG. 1 can be distributed across the stages (1202, 1204, 1206) in any manner. For instance, the processing stage 1204 generally implements the processing module 114 shown in FIG. 1. Each of the stages (1202, 1204, 1206)) can be physically implemented as a single apparatus for performing ascribed tasks, or multiple apparatuses coupled together in series or parallel fashion. The functions can be implemented by any combination of software and hardware.

Figure 13:
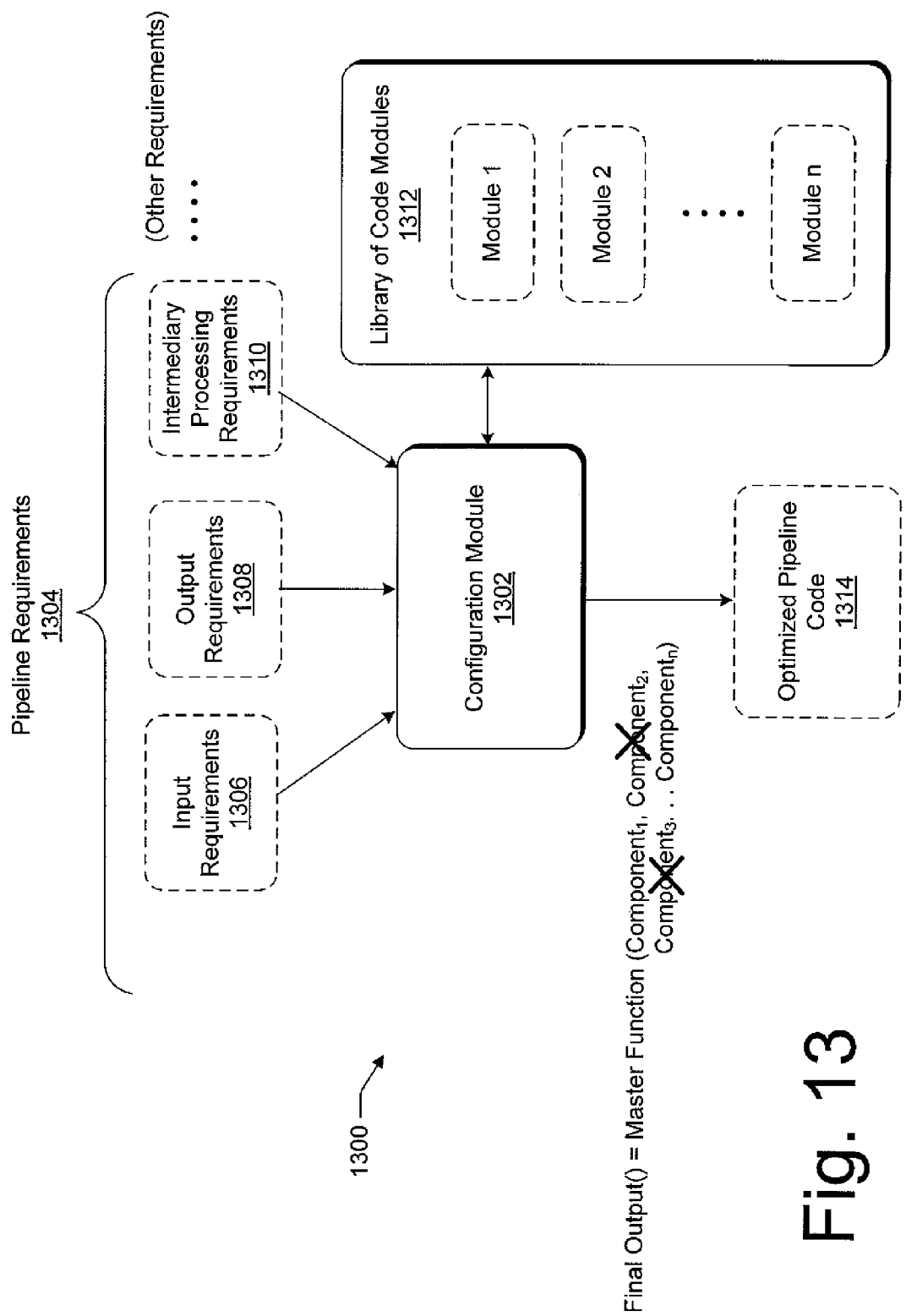
FIG. 13 shows an exemplary system for producing efficient code used to implement the image processing pipeline of FIG. 12, e.g., by eliminating code modules that are not required for a particular image processing application.

FIG. 13 shows an exemplary system 1300 for configuring the image processing pipeline 1200 shown in FIG. 12. More specifically, the exemplary system 1300 may comprise functionality for automatically generating computer code to implement the pipeline 1200 such that it carries out any combination of image processing operations shown in FIG. 1.

To function in the above-described manner, the system 1300 includes a configuration module 1302. The configuration module 1302 receives pipeline requirement information 1304 that defines the requirements that a configured pipeline should satisfy. The requirement information 1304 can have multiple components. An input requirements component 1306 defines the characteristics of image information that the pipeline is expected to receive. The input requirements component 1306 may define a singular kind of image information that can be processed, or can defined a set of plural permissible kinds of image information that can be processed. One way of conveniently specifying multiple characteristics of the permissible input information is to specify the video coding standard(s) being used, which may imply a whole host of features that the image information possesses, such as permissible color spaces, chroma sub-sampling schemes, gamma transfer functions, and so forth. For instance, ITU-R Recommendation BT.601 is an international standard that defines studio digital coding of image information. This standard uses a Y'CbCr coding of image information. ITU-R Recommendation BT.709 is an international standard that defines studio coding of high definition video information. High definition (HD) content represents video content that is higher than standard definition (SD), typically 1920×1080, 1280×720, and so forth. These are merely two of many video coding standards that an image processing pipeline can process.

An output requirements component 1308 defines the characteristics of image information that the pipeline is expected to output. That is, the output requirements component 1308 may define a singular kind of image information that can be generated to suit a particular output device, or can defined a set of plural permissible kinds of image information that can be generated to suit different kinds of output devices. Again, one way of conveniently specifying multiple characteristics of the permissible output information is to specify the video coding standard(s) being used.

An intermediary processing requirements component 1310 defines the nature of the processing tasks that the pipeline should perform on the input image information. Any number of processing tasks can be specified, including, but not limiting to, resizing (scaling), compositing, alpha-blending, edge detection, and so forth.

In general, a human operator may manually select the pipeline requirements 1304. Alternatively, one or more requirements 1304 can be automatically inferred from the environment in which the pipeline is to be employed.

Given the input pipeline requirements 1304, the configuration module 1302 performs the task of using static analysis to interact with a library of code modules 1312 to assemble a custom aggregation of code modules that meets the pipeline requirements 1304. One way of doing this is to generate a master equation which maps any kind of input information to any kind of output information involving any kind of intermediary processing. This master equation will include a number of components. The components are associated with respective code modules stored in the library 1312. In this implementation, the configuration module 1302 performs the task of compiling a custom aggregation of code modules by eliminating all of the components that are not necessary in view of the input pipeline requirements 1304. This has the effect of choosing certain code modules form the library 1312 and omitting other modules.

The result of the processing performed by the configuration module 1302 is optimized pipeline code 1314, which can then be applied to process image information. This code 1314 is streamlined to perform just the functions that are required of it. As a result, a pipeline built based on this code has the potential of executing its operations in a faster manner than, say, a large catch-all program that has various linked subroutines for handling many different tasks that may never be employed in a particular application.

To name but one example, assume that the task of the video pipeline in a particular application is to convert interlaced 4:2:2 Y'CbCr image information to an intermediary linear progressive 4:4:4 RGB color space, performing compositing in the RGB color space, and then output the resultant processed information to a television set. These series of operations invoke some operations (e.g., up-sampling, transfer matrix conversion, transfer function application, compositing, and so forth), but not other operations. Accordingly, the configuration module 1302 would produce just the code necessary to perform the computations that are required, and nothing else.

The configuration operation has been described above in the context of the inclusion or omission of modules. However, more advanced configuration functionality can perform other optimization operations, such as combining the selected code modules in a particularly efficient manner, eliminating redundant code that is common to the selected code modules, and so forth.

There are a number of ways to implement the configuration module 1302. One way of implementing this functionality is to leverage existing configuration tools (for example, a conventional C++ compiler) which already possess some ability to analyze source code and eliminate redundant code, and applying such functionality to the task at hand of optimizing the pipeline code by picking and choosing appropriate modules.

Figure 14:
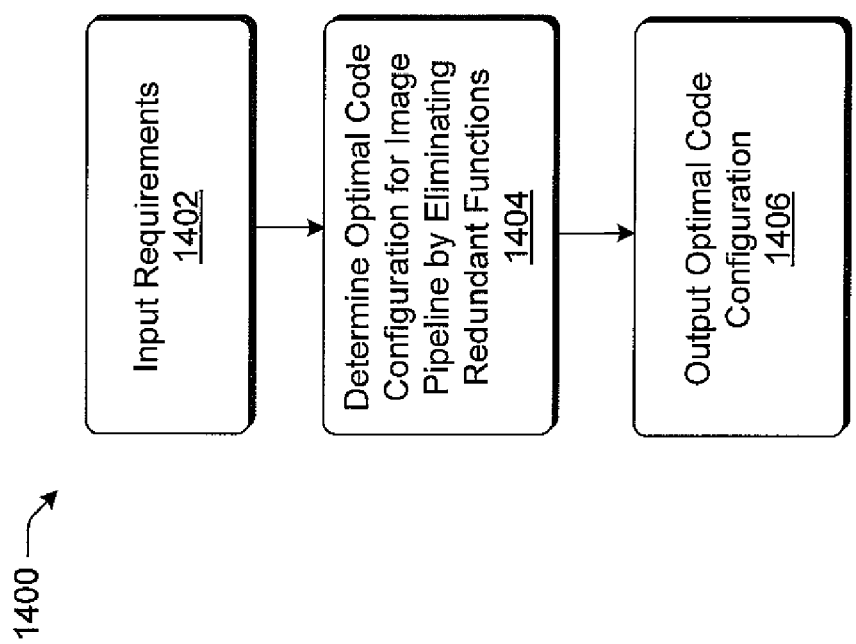
FIG. 14 shows an exemplary procedure for applying the code optimization system shown in FIG. 13.

FIG. 14 shows a procedure 1400 which summarizes the above discussion in flowchart form. Step 1402 entails inputting the video pipeline requirements. Step 1404 entails determining the optimal code which satisfies the input requirements. Step 1406 entails outputting and executing the optimal code.

B.2. General Use of GPU to Perform Image Processing

Figure 15:
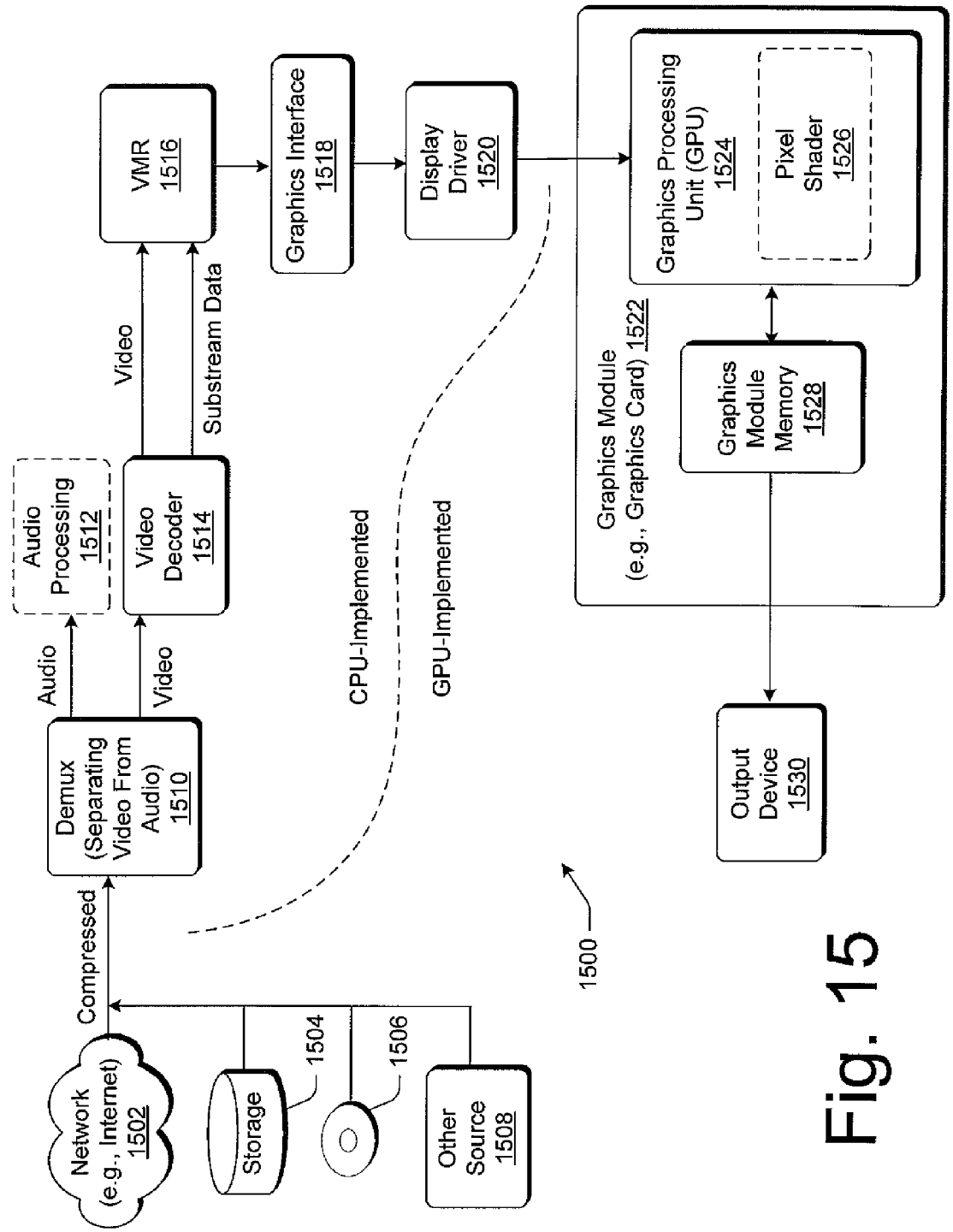
FIG. 15 shows an exemplary system for implementing the image processing pipeline of FIG. 12 by using a graphics processing unit (GPU) containing pixel shader functionality.

FIG. 15 shows an overview of an exemplary system 1500 that can be used to implement aspects of the image pipeline shown in FIG. 12 (and, more abstractly, the video processing operations 100 illustrated in FIG. 1). The system 1500 may represent a computer (such as a personal computer) containing one or more CPUs. The system 1500 allocates certain image processing tasks (or all image processing tasks) shown in FIG. 1 to graphics module functionality. The graphics processing functionality may comprise one or more graphics processing units (referred to in the art as GPUs). Generally, FIG. 15 includes a dashed line to demarcate functions that can be performed by the CPU of the system 1500 from functions that can be performed by the graphics module functionality of the system 1500 (although this demarcation is merely exemplary; other CPU/GPU allocations are possible).

By way of background, a GPU is generally a processing device like the CPU, but generally with less ability to perform branching-type decisions. Systems typically use GPUs to perform information-intensive rendering tasks that are repetitively performed, such as the rendering of information using a three-dimensional processing pipeline (involving vertex shaders, pixel shaders, and so forth). A mainstay of GPU use is therefore gaming and simulation technology, which uses the GPUs to render various scenes, characters, special effects and so forth. Allocating repetitive or information-intensive tasks to the GPU frees a system's CPU to perform other high-end managerial tasks, and thus improves the performance of such a system. In the present case, rather than the generation of gaming information, the system 1500 employs the graphics module functionality to modify received image information (e.g., video information) prior to output to any kind of output device. For example, one application of the system 1500 is to receive video information from a DVD, perform compositing on the video information within the graphics functionality (e.g., by combining text lettering on the video information), and then output the resultant signal to a television unit.

With the above overview, each of the exemplary components of FIG. 15 will be described in turn below. A later subsection (B.3) will provides more specific information regarding how the graphics module functionality can be employed to implement aspects of the pipeline 100 shown in FIG. 1.

To begin with, the system 1500 accepts image information from any one of a number of sources. For example, the system 1500 can accept image information from a network 1502 (such as a remote source coupled to the Internet), any kind of database 1504, any kind of computer readable disc media 1506 (such as an optical disk, DVD, etc.), or some other source 1508. In any case, the received information may contain a combination of image information and audio information. A demux unit 1510 separates the audio information from the image information. Audio processing functionality 1512 processes the audio information.

An image decoder 1514 processes the image information. The image decoder 1514 can convert the compressed image information from its received format to some other format, and so forth. The output of the image decoder 1514 can include so-called pure image information as well as image sub-stream information. The pure image information constitutes the principal image stream to be rendered on the display device. The image sub-stream information can constitute any supplemental information associated with the pure image information, such as close-captioning information, any kind of graphical overlay information (such as various graphical editing controls), various kinds of sub-images presented by DVD players, and so on). (In another implementation, certain aspects of the video decoder can be allocated to the graphics module functionality.)

In one exemplary implementation, a video mixing renderer (VMR) module 1516 performs a central role in the processing of the thus-received image information. By way of overview, the VMR module 1516 interacts with a graphics interface 1518 and a display driver 1520, which, in turn, controls a graphics module 1522. This interaction can involve probing the capabilities of the graphics module 1522. This interaction also involves coordinating the processing of the image information by the graphics interface 1518, display driver 1520, and graphics module 1522. In one implementation, the graphics interface 1318 can be implemented using the DirectDraw functionality provided by Microsoft® Corporation's DirectX. DirectDraw serves in this context as a messaging conduit for communicatively coupling the VMR module 1516 to the graphics module 1522. The graphics module 1522 itself can constitute a fixed module within a computer or like device, or it can constitute a detachable unit, such as a graphics card. (Generally, the commonly assigned applications mentioned in the first section of this disclosure provide details regarding exemplary data structures that the VMR module 1516 can use to interact with the graphics module 1522; as this interaction is not the focus of the present disclosure, the details of such interaction are not repeated herein.)

The graphics module 1522 itself includes one or more graphics processing units (GPUs) 1524. As mentioned above, the system can allocate any combination of processing operations shown in FIG. 1 to the GPU 1524. The GPU 1524 performs these tasks using a pixel shader 1526. A pixel shader refers to functionality that can perform various kinds of operations on image information on a pixel-by-pixel basis. Subsection B.3 provides additional information regarding the architecture of a typical pixel shader, and how such technology can be employed to perform the operations shown in FIG. 1.

The GPU 1524 can interact with a local memory 1528 associated with the graphics module 1522. This local memory 1528 can serve any number of storage-related purposes. For instance, this memory 1528 can store a final image surface which is then forwarded to an output device 1530 (such as a display monitor, a television unit, a storage device, a network target, and so forth).

B.3. Pixel Shader Related Improvements

Figure 16:
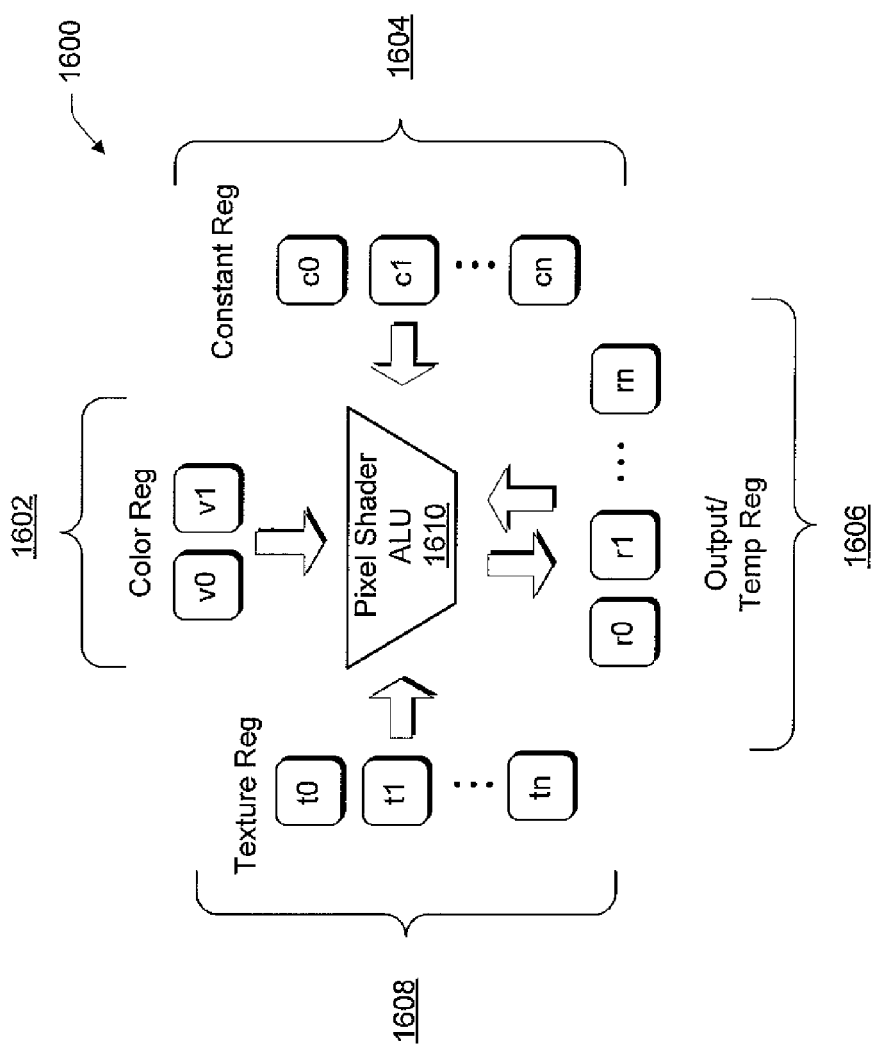
FIG. 16 shows a known pixel shader design.

By way of background, FIG. 16 shows a known architecture for a pixel shader 1600 that is commonly used in 3D processing pipelines. Each pixel in a typical pixel shader application can be represented by a vector of four floating point values, e.g., RGBA (red, green, blue, alpha), where each value corresponds to a separate channel. The pixel shader 1600 architecture includes a series of input/output registers (1602, 1604, 1606, 1608), and an arithmetic logic unit (ALU)

1610 for performing operations on the input data. More specifically, the registers include color registers 1602. These registers 1602 stream iterated vertex color data from a vertex shader (not shown) to pixel shader 1600. The constant registers 1604 provide user-defined constants to the pixel shader 1600. The output/temporary registers 1606 provide temporary storage for intermediate calculations. Within this register set, the register r0 also receives an output of the pixel shader 1600. The texture registers 1608 provide texture data to the pixel shader ALU 1610. The pixel shader ALU 1610 executes arithmetic and texture addressing instructions based on a program. The program includes a collection of instructions selected from a set of permissible pixel shader commands.

The ensuing discussion will particularly focus on the use of the texture registers 1608 (henceforth referred to more genetically as "units") to feed image information and filter weights to the pixel shader ALU 1610. Therefore, additional introductory information will be provided regarding the concept of textures in the context of FIG. 17.

Figure 17:
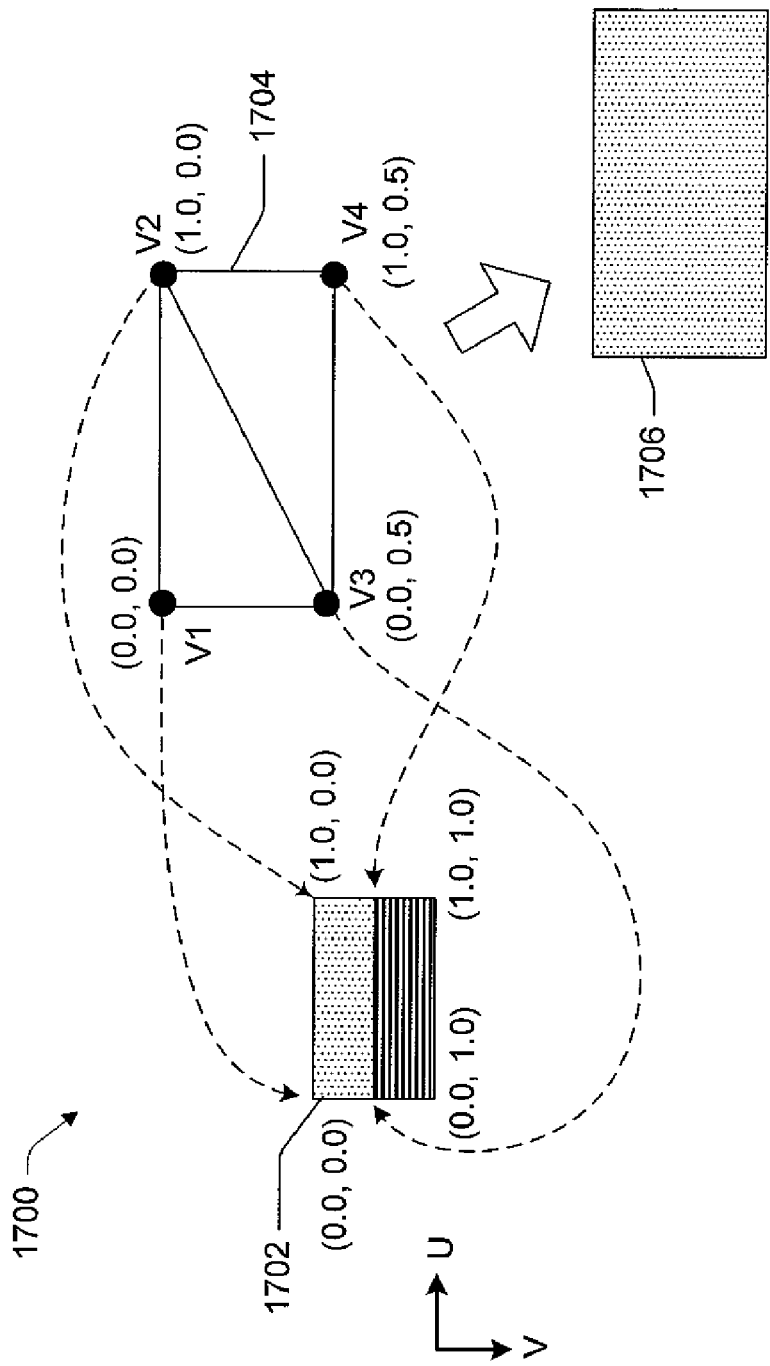
FIG. 17 shows general principles related to the application of texture information to polygons in the context of typical graphics applications.

Loosely stated, in game applications, a texture defines an image that is "pasted" onto polygonal surfaces defining characters, scenes, and so forth. FIG. 17 shows a texturing application operation 1700 in which a texture 1702 is applied to a polygon 1704. The polygon 1704 is comprised of two triangle primitives assembled to form a rectangle. The polygon 1704 includes four vertices, V1, V2, V3, and V4. Each vertex includes texture coordinates. The texture coordinates are specified with respect to a conventional U and V reference system. In this reference system, the U coordinate generally corresponds to an X axis, and the V coordinate generally corresponds to a Y axis. Values in the U axis are clamped to range from 0.0 to 1.0, and values in the V axis are likewise clamped to range from 0.0 to 1.0.

The texture coordinates associated with the vertices specify how the texture 1702 is to be placed onto the polygon 1704. In the exemplary case of FIG. 17, vertex V1 has texture coordinates of 0.0, 0.0, which corresponds to the upper left corner of the texture 1702. Vertex V2 has texture coordinates 1.0, 0.0, which corresponds to the upper right corner of the surface 1702. Vertex V3 has texture coordinates 0.0, 0.5, which corresponds to the middle of the left edge of the texture 1702. And vertex V4 has texture coordinates 1.0, 0.5, which corresponds to the middle of the right edge of the texture 1702. Accordingly, when the texture 1702 is mapped onto the polygon 1704 in accordance with the texture coordinates, only the upper half of the texture 1702 will be applied to the polygon 1704. The result of the application of texture 1702 to the polygon 1704 is shown in textured surface 1706.

3D processing pipelines typically allow a number of special texture processing operations, developed in the context of the generation of gaming information. One special operation is referred to as wrap mode. In the wrap mode, the 3D processing pipeline will repeat a texture a number of times, e.g., in one case, to produce a row or matrix of textures that have the same content. A mirror mode also duplicates an adjacent textures, but flips (reflects) the texture as would a mirror.

Further information regarding any pixel shader topics of a general nature can be found in a number of commercially available texts, such as Wolfgang F. Engel, *Direct3D Shader X: Vertex and Pixel Shader Tips and Tricks*, Wordware Publishing, Inc., 2002.

With the above introduction, the remaining discussion sets forth exemplary novel techniques for using a pixel shader to implement aspects of the image processing pipeline shown in FIG. 1.

Figure 18:
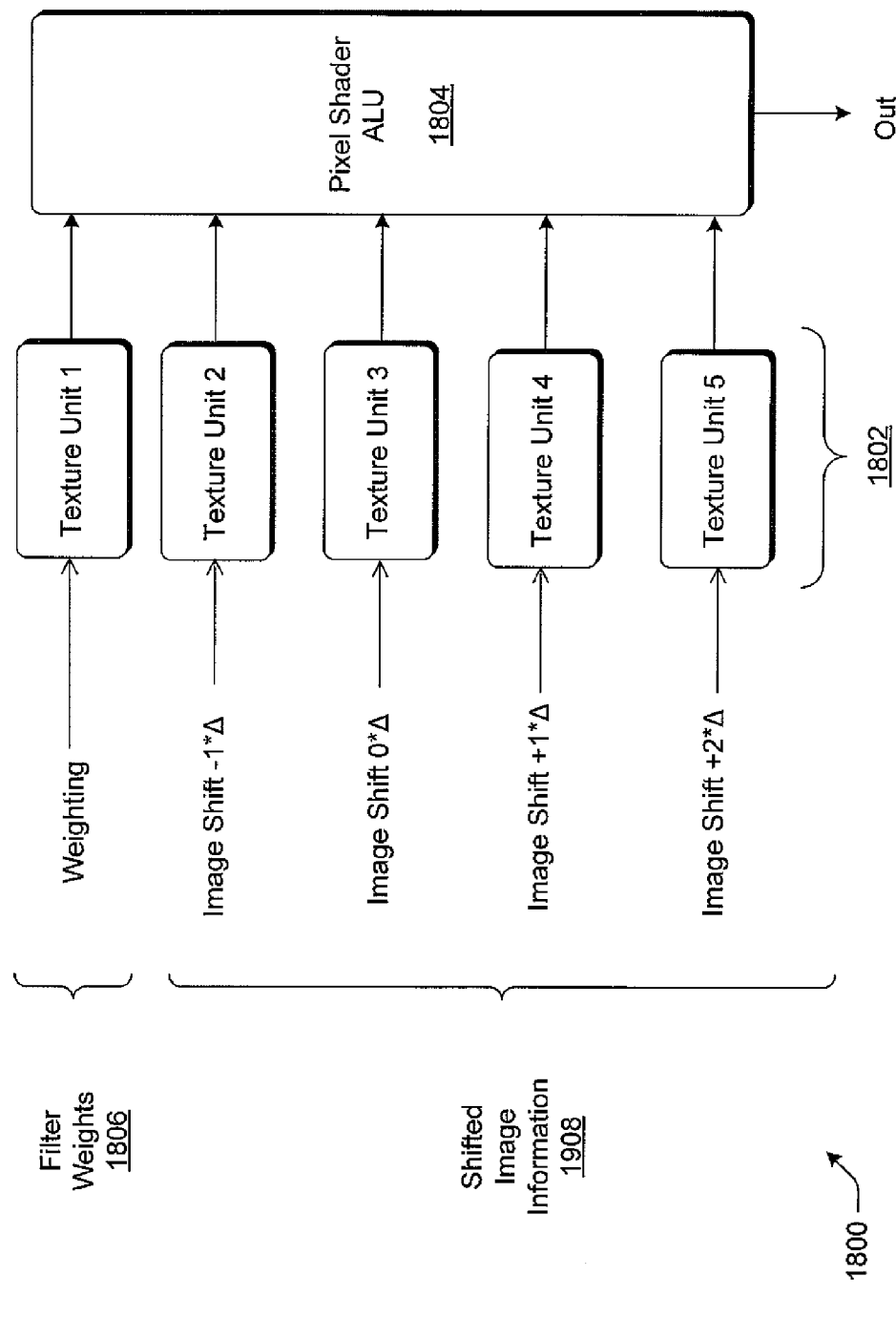
FIG. 18 shows an exemplary implementation of a 4-tap filter using a pixel shader.

To begin with, FIG. 18 shows an exemplary application 1800 of the pixel shader 1526 (of FIG. 15) to implement an image processing filter having a kernel with four taps. Since the type of processing shown in FIG. 18 is also foundational to many other operations performed by the pipeline 100 of FIG. 1, the principles set forth with respect to FIG. 18 apply to other kinds of processing that can be performed by the pixel shader 1526. The case of a four tap filter kernel, is, of course, merely illustrative; later examples explain how this model can be expanded to different filter designs.

Generally, the GPU 1524 can be configured to scan across one or more input images, extract the pixel values from each, apply a computation based on the inputs, and output a single pixel. This operation can be expressed as: output(x, y)=function(input$_1$(x, y), input$_2$(x, y), ... input$_p$(x, y), array constants [m]). In other words, this general expression says that the result (output(x, y)) mathematically depends on some function of various input signals (input$_1$(x, y), input$_2$(x, y), ... input$_p$(x, y)), and, optionally, various defined constants (array constants[m]).

In the particular context of image processing using filters, the pixel shader 1526 requires the input of one or more input images, along with associated filter weights to be applied to the images. More formally, a filter that generates an output (Out[x]) associated with an output pixel can be defined as follows:

$$\text{Out}[x]=\text{sum}(\text{in}[x-\text{taps}/2+i]*\text{kernel}[i], i=0 \ldots \text{taps}-1).$$

In other words, the output for a pixel (Out[x]) represents the weighted summation of different input terms. The kernel represents weighting information to be applied to the input terms. The different input terms, in turn, can represent shifted versions of the same excerpt the input image information.

FIG. 18 shows how the pixel shader 526 can implement the above equation. The four tap example 1800 shown shows a series of texture units 1802 that provide input to a pixel shader ALU 1804. The approach shown there is to assign the filter weights to the first texture unit, and assigned four different delta-shifted versions of the same image information to the next four texture units (representing the four taps of the kernel). The pixel shader ALU 1804 reads in the information stored in the texture units (in a single read operation), and provides a single output for a particular pixel (in a single write operation). This procedure is repeated a plurality of times to process an entire image. This approach defines a 1-D convolution filter with a support window of "Taps" filter taps.

The operation of the example 1800 shown in FIG. 18 can be more formally expressed as follows. The exemplary 1-D kernel in use has a width "w" pixels wide, and kernel weights of w[−1], w[0], w[2], and w[3]. The weight texture is computed by computing the four weights of the filter kernel for each pixel. The 1-D kernel also includes four inputs defined as in[−1], in[0], in[1], and in[2]. The symbol Δ is defined as 1/w. Given this, the following information is allocated to texture units 1-5:

Texture 1: the "weight texture," with coordinates of 0 ... 1;

Texture 2: in[−1], input image with coordinates of (0 ... 1)+(−1)*Δ(i.e., from 0−Δ to 1−Δ);

Texture 3: in [0], input image with coordinates of (0 ... 1)+(0)*Δ;

Texture 4: in[1], input image with coordinates of (0 ... 1)+(1)*Δ; and

Texture 5: in[2], input image with coordinates of (0 ... 1)+(2)*Δ(i.e., from 0+2* Δ to 1+2*Δ).

If tn represents the pixel fetched from texture unit "n", then the computations performed by the pixel shader ALU 1804 can be expressed by the following program:

Algorithm 3: Implementation of Filter Using a Pixel Shader

Let w[0]=t1.red
Let w[1]=t1.green
Let w[2]=t1.blue
Let w[3]=t1.alpha

Out.rgba=t2.rgba*w[0]+t3.rgba*w[1]+t4.rgba*w[2]+
t5.rgba*w[3]

In other words, the array w is first assigned the values of the weighting information that is stored in the first texture unit (t1). Then the output result (Out.rgba) is formed by modifying the shifted image information contained in texture units t2-t5 by the weights w. The suffixes attached to the register information define channel information. Accordingly, the output Out.rgba represents a vector of four floats stored in the red, green, blue and alpha channels. It can be seen that the above algorithm will require "taps"+1 input texture units, e.g., because one unit is allocated to storing weighting information.

Generally, where the input image information is expressed in RGB format, then the texture units can store equal amounts of red, green and blue components. However, where the pixel shader is applied to processing luma-related image information (such as YUV), then the texture units can store more luma information relative to chroma information (U, V). This provision takes advantage of the fact that the human eye is more sensitive to luma inflation than chroma information, so it is not necessary to store and process as much chroma information relative to luma information to achieve acceptable output results.

A number of variations and optimizations of the approach described above are contemplated.

According to one variation, the above-described wrap mode can be used to treat any texture as an infinite tile of image information. Using this mode, one approach is to set the input weighting texture's coordinates from 0 to 1.0/gcd (SourceWidth, DestinationWidth), rather than 0 . . . 1. In applying this texture, a texture prefetch unit will automatically "wrap around" to the next copy of the weighting information stored in the texture. This provision allows a designer to reduce the storage requirements of a kernel, yet still ensure that its information will be applied duplicated wherever needed.

According to another variation, the kernel may have more than four taps. To address this situation, an implementation can break up the sets of kernel weighting information into groups of four values and assign each to an additional input "weight" texture. Consider the case where there are six taps. In this case, an implementation can use two weighting textures (the first texture with four values, and the second texture with the remaining two values, leaving two slots unused). This implementation also requires six input image textures. Thus, to implement this design, an eight texture GPU can be used to perform filtering with six taps in a single pass.

According to another variation, the number of taps may exceed the number of texture units. Note that the computation of the output image information represents a summation of "taps" terms. Hence, larger numbers of taps can be computed by breaking the computation of the summation into multiple processing passes. For example, if the filter kernel has 12 taps, then one implementation can compute Out[x]=sum(in[x+i] *w[i], i=0 . . . 11) as:

Sum1$[x]$=sum(in$[x+i]$*w$[i]$, i=0 . . . 3)

Sum2$[x]$=sum(in$[x+i]$*w$[i]$, i=4 . . . 8)

Sum3$[x]$sum(in$[x+i]$*w$[i]$, i=9 . . . 11)

The implementation can then combine the results using a final pass:

Out$[x]$=sum1$[x]$+sum2$[x]$+sum3$[x]$ (three reads, one write)

Another possible implementation can form the aggregate Out[x] result via the following series of operations:

Out$[x]$=sum1$[x]$ (write)

Out$[x]$=out$[x]$+sum2$[x]$ (read, read, write)

Out$[x]$=out$[x]$+sum3$[x]$ (read, read, write)

The latter of the approaches requires substantially less memory than the former approach, but it also requires twice the memory accesses compared to the former approach (e.g., four reads and three writes). This feature of the latter strategy may render it unfeasible, as read-modify-write cycles on GPUs are very costly, or possibly prohibited.

According to another variation, an implementation can provide a special mode ("kill pixel") which treats all pixels outside defined image information as black (or some other default value). This provision can be applied to the automatically "hide" edge conditions in information that should not be displayed.

According to another variation, an implementation can apply the above-mentioned mirror mode in processing image information. This mode reflects the image information either horizontally or vertically when referencing image information outside of the boundaries of the image information.

Figure 19:
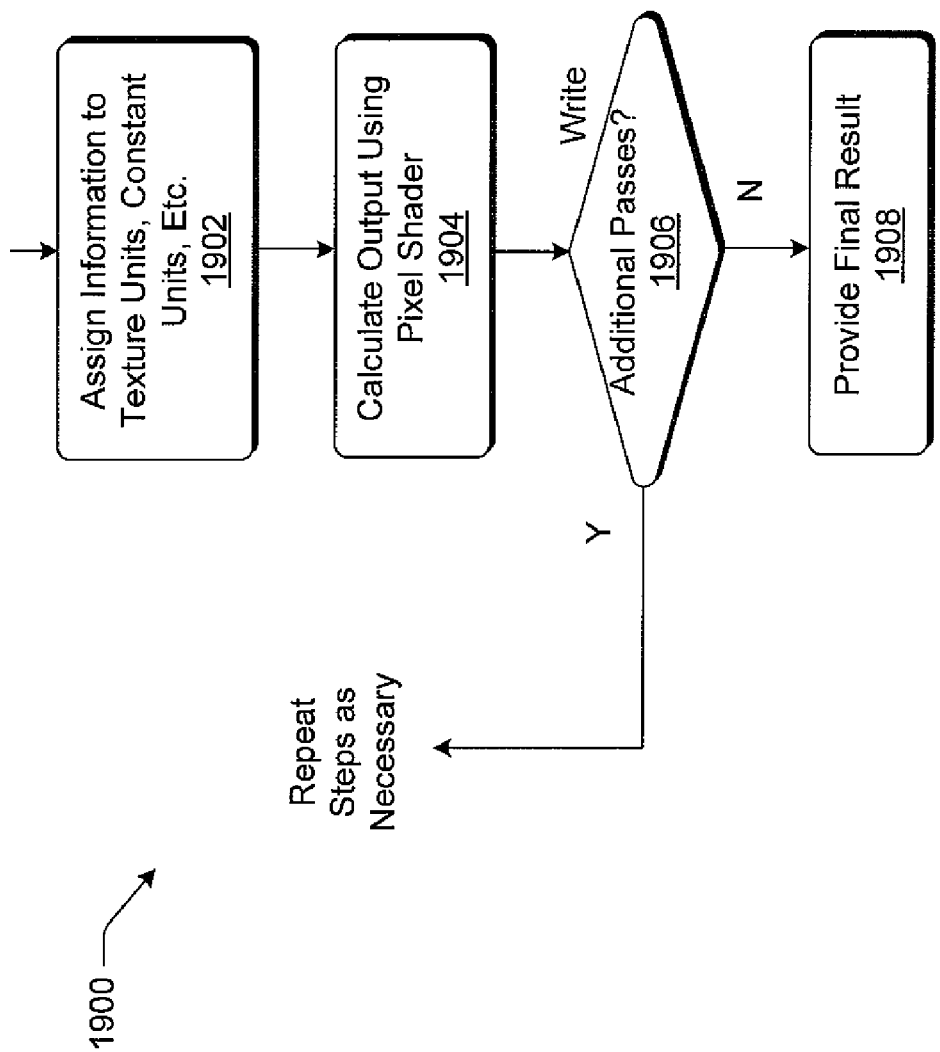
FIG. 19 shows an exemplary procedure that explains the operation of the filter of FIG. 19.

FIG. 19 shows a procedure 1900 which summarizes many of features described above. Step 1902 entails assigning various input information to the pixel shader's various input units. Such information can comprise image information and weighting information applied to various texture units, constants applied to various constant units, and so forth. Step 1904 entails calculating output image information on a pixel-by-pixel basis based on the programming instructions supplied to the pixel shader ALU 1804. Step 1906 determines whether additional passes are required. If so, the procedure 1900 repeats one or more of the operations shown in FIG. 19 one or more times. Step 1908 yields the final output result.

Figure 20:
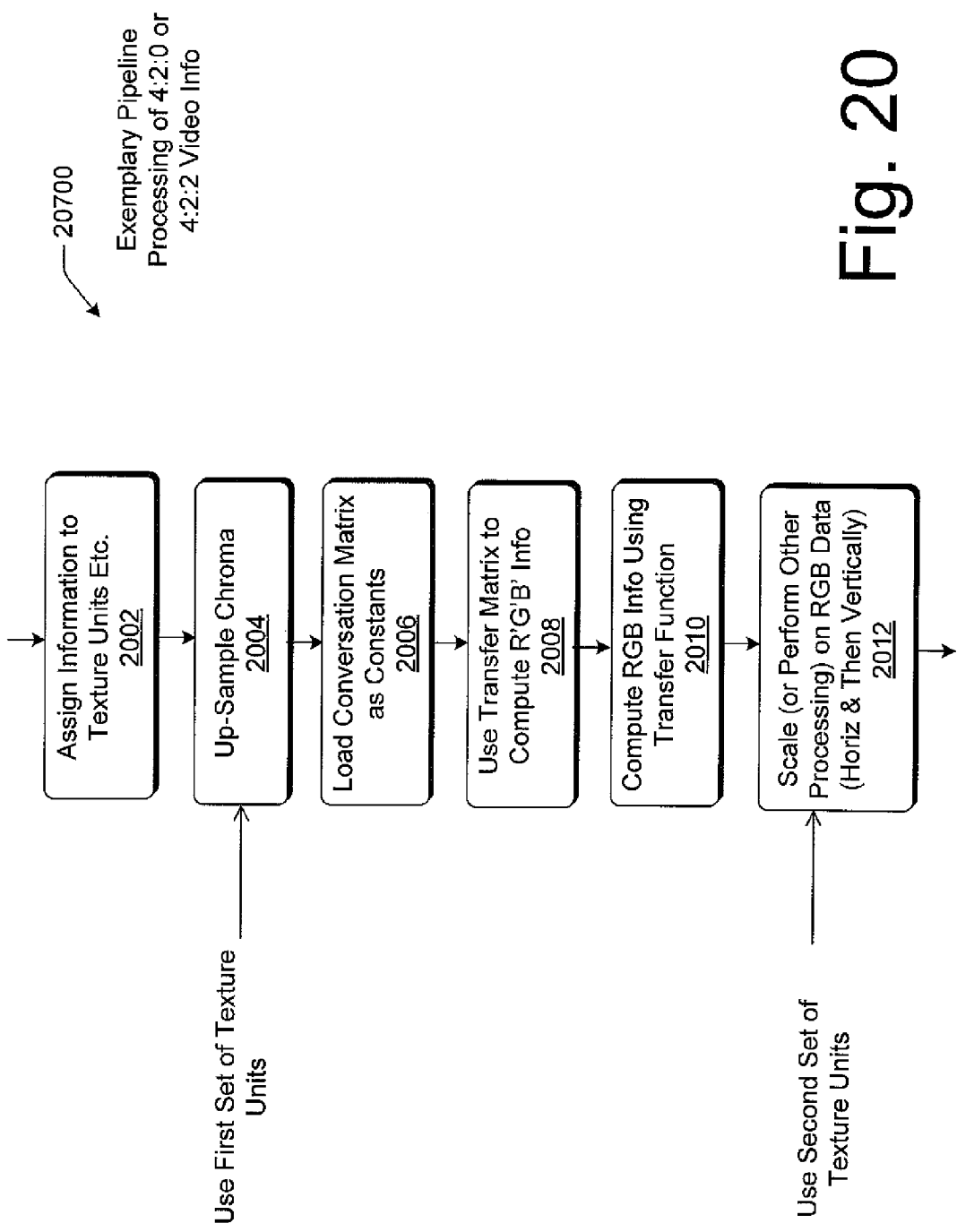
FIG. 20 shows a more general implementation of aspects of the image processing pipeline of FIG. 1 using a pixel shader.

As a final topics, FIG. 20 shows an application of the pixel shader 1526 that performs several of the operations introduced in the context of FIG. 1. FIG. 20 particularly addresses one exemplary application in which the pipeline receives 4:2:2 YUV image information, up-samples it, converts it to linear RGB form, and performs scaling on the resultant linear information. The processing shown in FIG. 20 is based on the concepts developed above with respect to FIGS. 18 and 19.

Note that 4:2:0 image information expressed in a hybrid planar format (such as NV12) can be treated as comprising a luma plane and a chroma plane. It is therefore possible to perform certain operations on this information in parallel.

One approach is to divide the texture units into two groups, one group for use in interpolating the chroma component. This up-sampling operation invokes a scaling enlargement operation that can be used to generate 4:4:4 chroma information. The pixel shader 1526 can then use the luma and interpolated chroma components to compute, on a pixel-by-pixel basis, the corresponding R'G'B' information using the transfer matrix.

Next the pixel shader 1526 can apply the transfer function to linearize the image information. Then, the pixel shader 1526 can be used to perform further scaling in the RGB space using the second group of texture units.

More formally, the following identifies an exemplary sequence of steps that can be used to transform the image information in the above-identified manner.

1) Set up textures 1-5 in the manner described above (shown in FIG. 18) to perform the first scaling operation.

2) Use the above-described scaling operation to compute CbCr information at twice the sampling rate as the luma information.

3) Load the Y'CbCr to R'G'B' color space conversion matrix into an array of 16 constants as a matrix M.

4) Compute the R'G'B' information in the following manner:

Compute $R' = \text{dotProd4}(M[0], aY'CbCr)$

Compute $G' = \text{dotProd4}(M[1], aY'CbCr)$

Compute $B' = \text{dotProd4}(M[2], aY'CbCr)$

Compute $A = \text{dotProd4}(M[3], aY'CbCr)$

5) Compute RGB from R'G'B' using the transfer function.

6) Perform the second scaling operation by computing the scaled linear RGB data using the algorithms set forth above (with reference to FIG. 18), but with textures 6-12.

7) After the horizontal scale is performed, apply the vertical scale to the RGB information.

FIG. 20 shows a procedure 2000 which explains the above-described algorithm in flowchart form. Step 2002 involves assigning information to appropriate texture units (e.g., a first set of texture units). Step 2004 entails using the first set of texture units to up-sample the chroma information. Step 2006 entails loading constants for use in performing color space conversion into the pixel shader 1526. Step 2008 entails using the constants to convert the image information into nonlinear R'G'B' form. Step 2010 entails converting the R'G'B' information into linear RGB form. And step 2012 entails scaling the RGB information.

C. Exemplary Computer Environment

Figure 21:
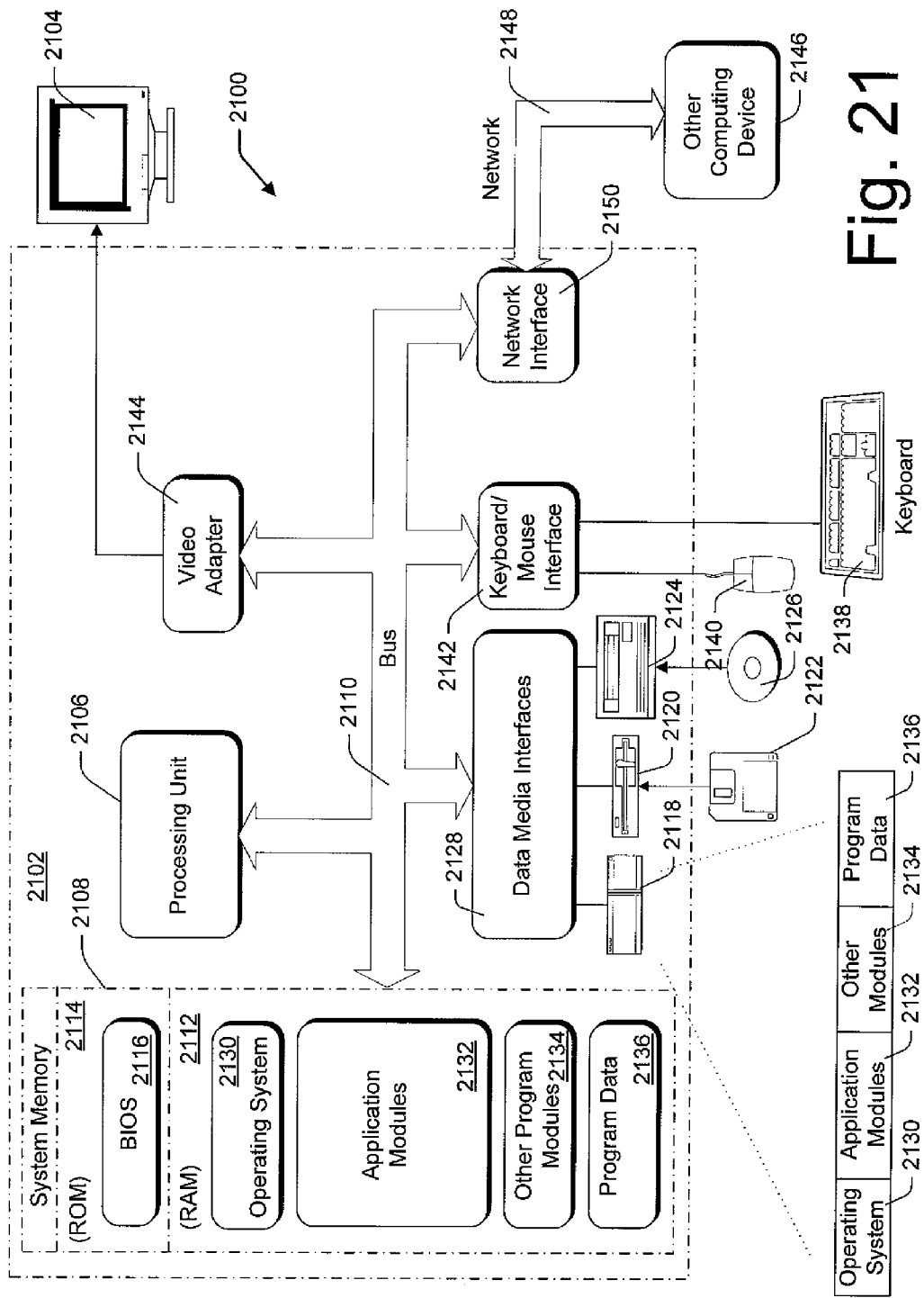
FIG. 21 shows an exemplary computer environment for implementing aspects of various features shown in the preceding figures.

In one exemplary implementation, various aspects of the processing shown in the preceding figures can be performed by computing equipment. In this case, FIG. 21 provides information regarding an exemplary computer environment 2100 that can be used to implement aspects of the processing shown in preceding figures. For example, a computer can be used to implement part or all of the image processing pipeline 100 shown in FIG. 1.

The computing environment 2100 includes a general purpose type computer 2102 and a display device 2104. However, the computing environment 2100 can include other kinds of computing equipment. For example, although not shown, the computer environment 2100 can include handheld or laptop devices, set top boxes, game consoles, processing functionality integrated into video processing/presentation devices (e.g., televisions, DVRs, etc.), mainframe computers, and so forth. Further, FIG. 21 shows elements of the computer environment 2100 grouped together to facilitate discussion. However, the computing environment 2100 can employ a distributed processing configuration. In a distributed computing environment, computing resources can be physically dispersed throughout the environment.

Exemplary computer 2102 includes one or more processors or processing units 2106, a system memory 2108, and a bus 2110. The bus 2110 connects various system components together. For instance, the bus 2110 connects the processor 2106 to the system memory 2108. The bus 2110 can be implemented using any kind of bus structure or combination of bus structures, including a memory bus or memory controller, a peripheral bus, an accelerated graphics port, and a processor or local bus using any of a variety of bus architectures. The computer 2102 can also couple to one or more CPU units (not shown) in the manner described above.

Computer 2102 can also include a variety of computer readable media, including a variety of types of volatile and non-volatile media, each of which can be removable or non-removable. For example, system memory 2108 includes computer readable media in the form of volatile memory, such as random access memory (RAM) 2112, and non-volatile memory, such as read only memory (ROM) 2114. ROM 2114 includes an input/output system (BIOS) 2116 that contains the basic routines that help to transfer information between elements within computer 2102, such as during start-up. RAM 2112 typically contains data and/or program modules in a form that can be quickly accessed by processing unit 2106.

Other kinds of computer storage media include a hard disk drive 2118 for reading from and writing to a non-removable, non-volatile magnetic media, a magnetic disk drive 2120 for reading from and writing to a removable, non-volatile magnetic disk 2122 (e.g., a "floppy disk"), and an optical disk drive 2124 for reading from and/or writing to a removable, non-volatile optical disk 2126 such as a CD-ROM, DVD-ROM, or other optical media. The hard disk drive 2118, magnetic disk drive 2120, and optical disk drive 2124 are each connected to the system bus 2110 by one or more data media interfaces 2128. Alternatively, the hard disk drive 2118, magnetic disk drive 2120, and optical disk drive 2124 can be connected to the system bus 2110 by a SCSI interface (not shown), or other coupling mechanism. Although not shown, the computer 2102 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 2102. For instance, the readable media can store the operating system 2130, application modules 2132, other program modules 2134, and program data 2136.

The computer environment 2100 can include a variety of input devices. For instance, the computer environment 2100 includes the keyboard 2138 and a pointing device 2140 (e.g., a "mouse") for entering commands and information into computer 2102. The computer environment 2100 can include other input devices (not illustrated), such as a microphone, joystick, game pad, satellite dish, serial port, scanner, card reading devices, digital or video camera, etc. Input/output interfaces 2142 couple the input devices to the processing unit 2106. More generally, input devices can be coupled to the computer 2102 through any kind of interface and bus structures, such as a parallel port, serial port, game port, universal serial bus (USB) port, etc.

The computer environment 2100 also includes the display device 2104. A video adapter 2144 couples the display device 2104 to the bus 2110. In addition to the display such as speakers (not shown), a printer (not shown), etc.

Computer 2102 operates in a networked environment using logical connections to one or more remote computers, such as a remote computing device 2146. The remote computing device 2146 can comprise any kind of computer equipment, including a general purpose personal computer, portable computer, a server, a game console, a network extension device, and so forth. Remote computing device 2146 can include all of the features discussed above with respect to computer 2102, or some subset thereof. Any type of network 2148 can be used to couple the computer 2102 with remote computing device 2146, such as a WAN, a LAN, etc. The computer 2102 couples to the network 2148 via network interface 2150, which can utilize broadband connectivity, modem connectivity, DSL connectivity, or other connection strategy. Although not illustrated, the computing environment 2100 can provide wireless communication functionality for connecting computer 2102 with remote computing device 2146 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

Moreover, a number of features were described herein by first identifying exemplary problems that these features can address. This manner of explication does not constitute an admission that others have appreciated and/or articulated the problems in the manner specified herein. Appreciation and articulation of the problems present in the video processing art is to be understood as part of the present invention.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for performing a scaling operation on image information using a filter, comprising:
    computing, based on scaling to be performed, a number of filter kernels required to implement the filter;
    pre-computing and storing the number of filter kernels; and
    applying the pre-computed filter kernels to a subset of the image information,
    wherein the applying comprising repeatedly sequencing through the filter kernels if there are more pixel elements in the subset of image information than there are pre-computed filter kernels;
    performing the scaling operation using the pixel shader by:
        assigning weighting information to at least one texture unit;
        assigning delta-shifted versions of the image information to plural other texture units; and
        performing an operation using the pixel shader based on information received from the texture units, to provide an output result.

2. The method of claim 1, wherein the scaling operation employs a Catmull-Rom filter.

3. The method of claim 1, wherein the computing also involves determining how many taps each kernel should have.

4. The method of claim 1, wherein the subset of the image information comprises a row of the image information.

5. The method of claim 1, wherein the subset of the image information comprises a column of the image information.

6. The method of claim 1, further comprising constraining the scaling operation to scaling options that do not require more than a prescribed number of filter kernels.

7. The method of claim 1, further comprising applying the pre-computed filter kernels that were computed for the subset of the image information to other subsets of the image information.

8. The method of claim 1, further comprising performing the scaling operation using the pixel shader by:
    assigning weighting information to at least one texture unit;
    assigning delta-shifted versions of the image information to plural other texture units; and
    performing an operation using the pixel shader based on information received from the texture units, to provide an output result.

9. One or more computer readable media storing machine-readable instructions configured to implement the method of claim 1.

10. An apparatus for performing a scaling operation on image information using a filter, comprising:
    a dynamic kernel pre-calculation module configured to:
        compute, based on scaling to be performed, a number of filter kernels required to implement the filter; and
        pre-compute and store the number of filter kernels;
    a kernel storage module configured to store the pre-computed filter kernels; and
    a kernel application module configured to apply the pre-computed filter kernels to a subset of the image information, wherein the applying comprising repeatedly sequencing through the filter kernels if there are more pixel elements in the subset of image information than there are pre-computed filter kernels,
    wherein the pixel shader includes plural texture units, and wherein the pixel shader is configured to perform the scaling operation by:
    assigning weighting information to at least one texture unit;
    assigning delta-shifted versions of the image information to plural other texture units; and
    performing an operation using the pixel shader based on information received from the texture units, to provide an output result.

11. The apparatus of claim 10, wherein the scaling operation employs a Catmull-Rom filter.

12. The apparatus of claim 10, further including a graphical processing unit that includes a pixel shader for performing the scaling operation.

13. A method for performing at least one processing task in an image processing pipeline using a pixel shader of a graphical processing unit, comprising:
    assigning weighting information to at least one texture unit of the pixel shader;
    assigning delta-shifted versions of input image information to plural other texture units of the pixel shader;
    performing an operation using the pixel shader based on the information from the texture units, to thereby provide an output result; and
    performing plural operations using the pixel shader to generate a final output result on the basis of plural partial output results, wherein the performing of plural operations is applied to a case in which the scaling operation uses a filter having a number of taps which exceeds a number of available texture units.

14. The method of claim 13, further comprising applying a hide pixel mode to automatically hide edge conditions in image information that should not be displayed.

15. The method of claim 13, further comprising applying a mirror mode to reflect image information either horizontally or vertically when referencing image information outside boundaries of the image information.

16. One or more computer readable media storing machine-readable instructions configured to implement the method of claim 13.

* * * * *